US008149330B2

(12) United States Patent
Streijl

(10) Patent No.: US 8,149,330 B2
(45) Date of Patent: Apr. 3, 2012

(54) METHODS, SYSTEMS, AND PRODUCTS FOR AUTOMATED CORRECTION OF CLOSED CAPTIONING DATA

(75) Inventor: Robert Streijl, Cumming, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1111 days.

(21) Appl. No.: 12/009,347

(22) Filed: Jan. 19, 2008

(65) Prior Publication Data

US 2009/0185074 A1 Jul. 23, 2009

(51) Int. Cl.
*H04N 7/00* (2011.01)

(52) U.S. Cl. ......... 348/468; 348/564; 704/235; 704/211

(58) Field of Classification Search .............. 348/10, 348/12, 468, 473, 478, 552, 563–565, 906, 348/588; 704/211, 235; 725/139, 152
See application file for complete search history.

(56) References Cited

U.S. PATENT DOCUMENTS

| 5,327,174 | A | | 7/1994 | Kim | |
|---|---|---|---|---|---|
| 5,481,296 | A | * | 1/1996 | Cragun et al. | 725/136 |
| 5,526,635 | A | * | 6/1996 | Wilder, Jr. | 56/11.3 |
| 5,703,655 | A | * | 12/1997 | Corey et al. | 348/468 |
| 5,742,352 | A | | 4/1998 | Tsukagoshi | |
| 5,781,687 | A | | 7/1998 | Parks | |
| 5,867,205 | A | * | 2/1999 | Harrison | 725/38 |
| 5,995,155 | A | * | 11/1999 | Schindler et al. | 348/461 |
| 6,005,565 | A | * | 12/1999 | Legall et al. | 715/721 |
| 6,061,056 | A | * | 5/2000 | Menard et al. | 715/704 |
| 6,075,550 | A | | 6/2000 | Lapierre | |
| 6,151,018 | A | * | 11/2000 | Webb et al. | 715/722 |
| 6,266,094 | B1 | * | 7/2001 | Taylor, Jr. | 348/465 |
| 6,473,778 | B1 | | 10/2002 | Gibbon | |
| 6,476,871 | B1 | | 11/2002 | Fu | |
| 6,571,392 | B1 | * | 5/2003 | Zigmond et al. | 725/110 |
| 6,580,437 | B1 | * | 6/2003 | Liou et al. | 715/719 |
| 6,637,032 | B1 | | 10/2003 | Feinleib | |
| 6,952,236 | B2 | * | 10/2005 | Orr | 348/465 |
| 7,054,804 | B2 | | 5/2006 | Gonzales | |
| 7,079,756 | B2 | | 7/2006 | Hutter | |
| 7,130,790 | B1 | | 10/2006 | Flanagan | |
| 7,268,823 | B2 | | 9/2007 | Mitts | |
| 7,646,431 | B2 | * | 1/2010 | Lee | 348/465 |
| 7,701,511 | B2 | * | 4/2010 | Kurose et al. | 348/465 |
| 7,747,434 | B2 | * | 6/2010 | Flanagan et al. | 704/235 |
| 2003/0061280 | A1 | | 3/2003 | Bulson | |
| 2005/0079477 | A1 | | 4/2005 | Diesel | |
| 2005/0086702 | A1 | | 4/2005 | Cormack | |
| 2005/0177856 | A1 | | 8/2005 | Lee | |
| 2005/0228676 | A1 | | 10/2005 | Ifukube | |
| 2005/0235031 | A1 | | 10/2005 | Schneider | |
| 2005/0273840 | A1 | | 12/2005 | Mitts | |
| 2006/0044469 | A1 | | 3/2006 | Kim | |

* cited by examiner

*Primary Examiner* — Annan Shang
(74) *Attorney, Agent, or Firm* — Scott P. Zimmerman PLLC

(57) ABSTRACT

Methods, systems, and products are disclosed for automated correction of closed-captioning data. Patterns of characters are stored in memory. A digital stream is received having the closed captioning data encoded therein. The closed captioning data is decoded from the received digital stream. A sequence of closed captioning characters is acquired from the decoded closed captioning data. The memory is queried for the sequence of closed captioning characters. If the sequence of closed captioning characters contains a pattern stored in the memory, then the sequence of closed captioning characters is diverted to a syntactical checker. If the sequence of closed captioning characters fails to contain the patterns of characters, then the sequence of closed captioning characters is processed for display.

20 Claims, 24 Drawing Sheets

US 8,149,330 B2

METHODS, SYSTEMS, AND PRODUCTS FOR AUTOMATED CORRECTION OF CLOSED CAPTIONING DATA

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to television and to interactive video distribution systems and, more particularly, to error correction of closed captioning data.

Closed captioning data may contain errors. Closed captioning data allows for the visualization of spoken language in a textual format. A decoder in a television set (or in a set-top box) decodes the closed captioning data for display as text in a picture area. Sometimes, however, the closed captioning text is out-of-sync, incorrect (e.g., missing letters or words), or even illegible. These errors may be caused by problems in the distribution network that delivers the closed captioning data, by transcription errors, or by decoding problems in the television or set-top box. These errors detract from the effectiveness, and purpose, of closed captioning data and greatly impact the reader's quality of experience.

SUMMARY

Exemplary embodiments provide methods, systems, and products for automated correction of closed captioning data. Exemplary embodiments may correct mistakes in the closed captioning data. Patterns of characters are stored in memory. The patterns of characters may include erroneous and/or offensive combinations of characters that are to be corrected. A digital stream is received having the closed captioning data encoded therein. The closed captioning data is decoded from the received digital stream. A sequence of closed captioning characters is acquired from the decoded closed captioning data. The memory is queried for the sequence of closed captioning characters. If the sequence of closed captioning characters contains a pattern stored in the memory, then the sequence of closed captioning characters is diverted to a syntactical checker. If the sequence of closed captioning characters fails to contain the patterns of characters, then the sequence of closed captioning characters is processed for display. Exemplary embodiments may also correct synchronization errors between the spoken, audible words and the textual, closed captioning data. If the closed captioning data leads, or lags, the audio-visual signal, then exemplary embodiments may correct and/or restore synchronization.

More exemplary embodiments include a system for correcting closed captioning data. Patterns of characters are stored in memory. A digital stream is received having the closed captioning data encoded therein. The closed captioning data is decoded from the received digital stream. A sequence of closed captioning characters is acquired from the decoded closed captioning data. The memory is queried for the sequence of closed captioning characters. If the sequence of closed captioning characters contains a pattern stored in the memory, then the sequence of closed captioning characters is diverted to a syntactical checker. If the sequence of closed captioning characters fails to contain the patterns of characters, then the sequence of closed captioning characters is processed for display.

Other exemplary embodiments describe a computer program product for correcting closed captioning data. A computer readable media stores processor executable instructions. The instructions cause a processor to store patterns of characters in memory. A digital stream is received having the closed captioning data encoded therein. The closed captioning data is decoded from the received digital stream. A sequence of closed captioning characters is acquired from the decoded closed captioning data. The memory is queried for the sequence of closed captioning characters. If the sequence of closed captioning characters contains an offensive and/or erroneous pattern stored in the memory, then the sequence of closed captioning characters is diverted to a syntactical checker. If the sequence of closed captioning characters fails to contain the patterns of characters, then the sequence of closed captioning characters is processed for display.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
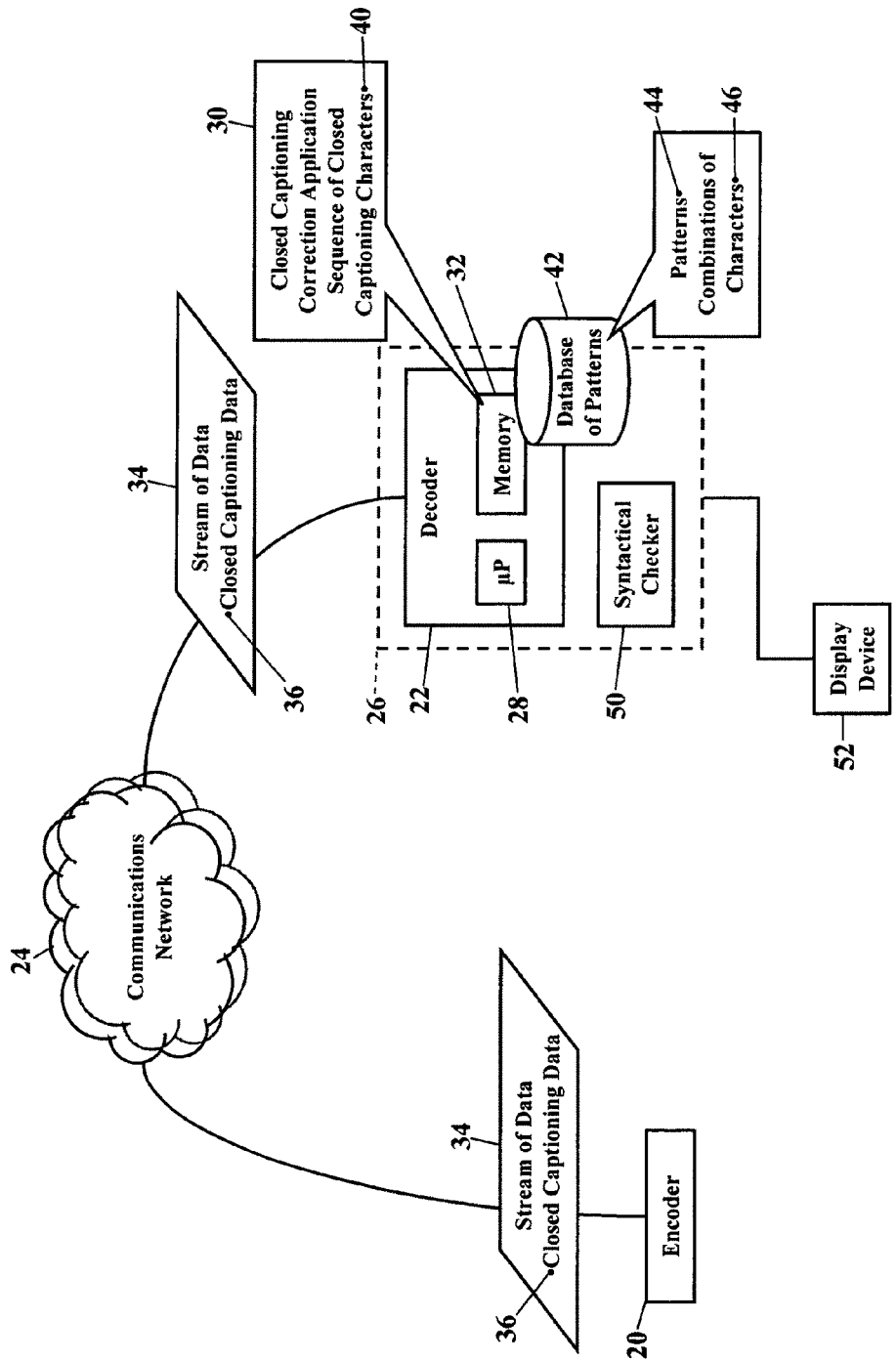
FIG. 1 is a schematic illustrating an operating environment in which exemplary embodiments may be implemented.

FIG. 1 is a simplified schematic illustrating an environment in which exemplary embodiments may be implemented. An encoder 20 communicates with a decoder 22 via a communications network 24. The decoder 22 may be a component of any electronic device 26, such as a television, a set-top box, or a computer. The decoder 22 has, or even shares, a processor 28 (e.g., "µP"), application specific integrated circuit (ASIC), or other device that executes a closed captioning correction application 30 in a memory 32. As FIG. 1 illustrates, the encoder 20 sends, routes, broadcasts, unicasts, multicasts, or addresses a stream 34 of data to the decoder 22. The stream 34 of data may be any analog or digital audio-visual signal having closed captioning data 36 encoded therein. The stream 34 of data, for example, may be an analog or digital television signal formatted according to the National Television Standards Committee (NTSC). The stream 34 of data may additionally or alternatively be a signal formatted according to the Society of Motion Picture and Television Engineers (SMPTE) serial digital bit stream. The stream 34 of data may additionally or alternatively have the closed captioning data 36 encoded into a vertical blanking interval. The stream 34 of data may additionally or alternatively be a digital, standard definition signal, or a high-definition signal, operating in a serial digital interface. The stream 34 of data may additionally or alternatively be formatted according to any of the Electronic Industries Alliance (EIA) standards (such as EIA-608 and/or EIA-708). The stream 34 of data may additionally or alternatively be formatted according to any of the Advanced Television Systems Committee (ATSC) formats (such as A/53 and A/54). However the stream 34 of data is formatted, all these standards are well known to those of ordinary skill in the art and, thus, not further discussed.

The decoder 22 then decodes and inspects the closed captioning data 36. The decoder 22 receives the stream 34 of data via the communications network 24. The decoder 22 decodes the closed captioning data 36 from the stream 34 of data. There are many known techniques for decoding the closed captioning data 36, and exemplary embodiments are compatible and adaptable to any of these techniques. However the closed captioning data 36 is decoded, a sequence 40 of closed captioning characters is acquired. The sequence 40 of closed captioning characters is then compared to entries stored in the memory 32. According to exemplary embodiments, the memory 32 stores unusual, incorrect, or even offensive patterns 44 and/or combinations 46 of characters. The memory 32, for example, may include a cache component that stores the unusual, incorrect, or even offensive patterns 44 and/or combinations 46 of characters. FIG. 1, for simplicity, illustrates the patterns 44 and/or combinations 46 of characters as being stored in a database 42 of patterns. The database 42 of patterns is illustrated as being locally stored in the memory 32 of the electronic device 26, yet the database 42 of patterns may be remotely located and accessible via the communications network 24. Regardless, the database 42 of patterns may store unusual, incorrect, or even offensive patterns 44 and/or combinations 46 of characters. The closed captioning correction application 30 instructs the processor 28 to query the database 42 of patterns for the sequence 40 of closed captioning characters. If the sequence 40 of closed captioning characters contains any pattern 44 or combination 46 of characters that are stored in the database 42 of patterns, then the sequence 40 of closed captioning characters may be diverted to a syntactical checker 50 for further processing (as later paragraphs will explain). If, however, the sequence 40 of closed captioning characters fails to contain any of the patterns 44 and/or combinations 46 of characters, then the sequence 40 of closed captioning characters may be processed for display on a display device 52, as is known. The closed captioning correction application 30 is thus a set of processor-executable instructions that correct mistakes in the closed captioning data 36.

Figure 2:
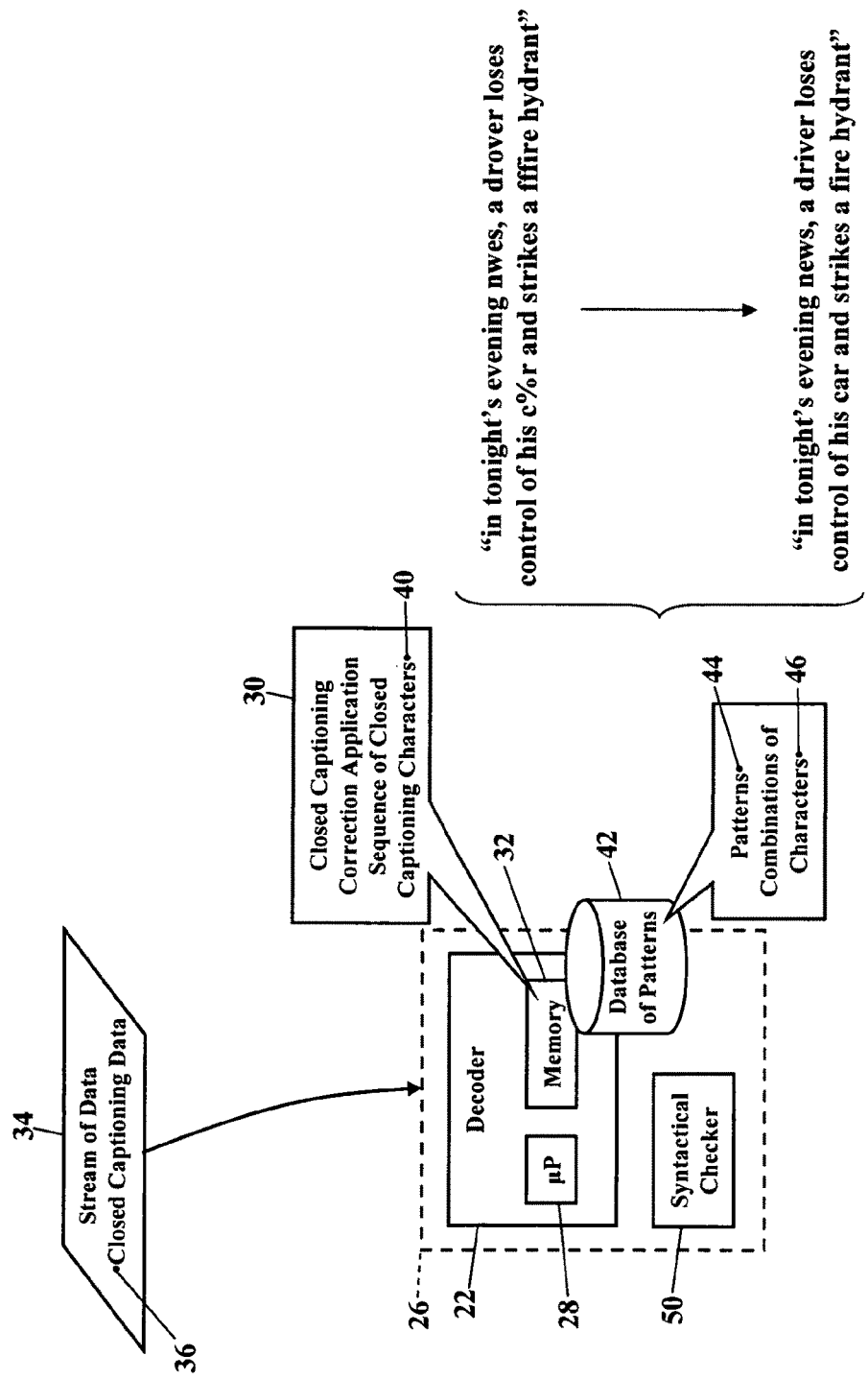
FIG. 2 is a schematic further illustrating correction of the closed captioning data, according to exemplary embodiments.

FIG. 2 is a schematic further illustrating correction of the closed captioning data 36, according to exemplary embodiments. Suppose the closed captioning data 36 contains the sequence 40 "in tonight's evening nwes, a drover looses control of his c%r and strikes a fffire hydrant." Suppose also that the database 42 of patterns stores the following patterns 44 and combinations 46 of characters: "c%r," "drover," "nwes," and "fff." When the closed captioning correction application 30 instructs the processor 28 to query the database 42 of patterns for the sequence 40 of closed captioning characters, the database 42 of patterns finds or discovers matches to its database entries. The closed captioning correction application 30 then instructs the processor 28 to divert the sequence 40 of closed captioning characters ("in tonight's evening nwes, a drover looses control of his c%r and strikes a fffire hydrant") to the syntactical checker 50. As later paragraphs will explain, the syntactical checker 50 corrects the sequence 40 to "in tonight's evening news, a driver looses control of his car and strikes a fire hydrant." The closed captioning correction application 30 then instructs the processor 28 to process the corrected sequence 40 of closed captioning characters for display.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 3:
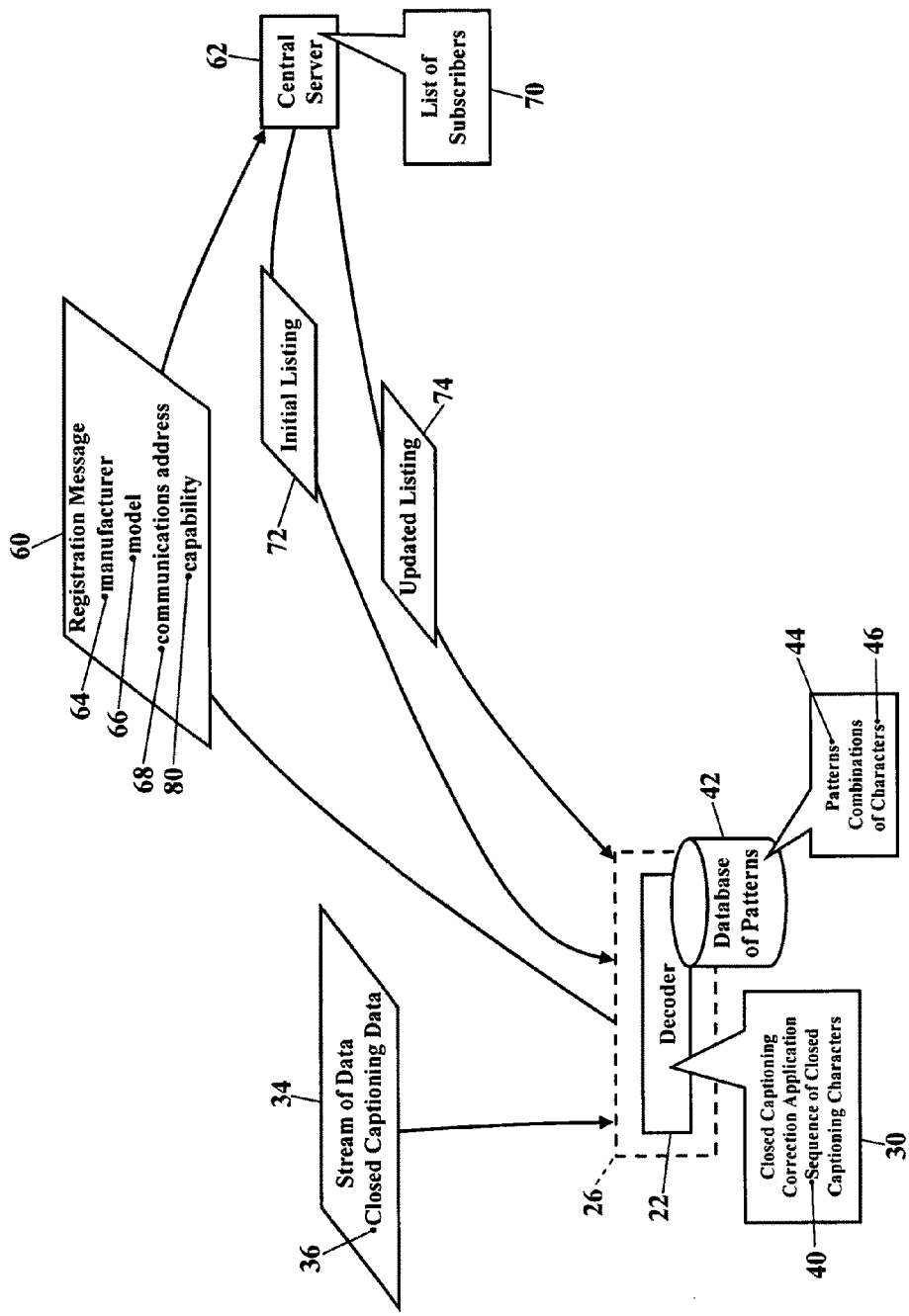
FIG. 3 is a schematic illustrating a remote update to the database of patterns, according to more exemplary embodiments.

FIG. 3 is a schematic illustrating a remote update to the database 42 of patterns, according to more exemplary embodiments. Here a service provider (such as a provider of the closed captioning data 36) may perform online updates to the database 42 of patterns. The database 42 of patterns may store the patterns 44 and combinations 46 of characters that should be edited and/or removed from the closed captioning data 36. When the closed captioning correction application 30 has online access (e.g., access to the communications network 24 illustrated in FIG. 1), the closed captioning correction application 30 may cause a registration message 60 to be sent to a central server 62 (via the communications network 24, illustrated in FIG. 1). The registration message 60 may include identification information, such as a manufacturer 64 and/or model number 66 of the electronic device 26, along with a communications address 68 (such as an Internet Protocol address 68 assigned to or used by the electronic device 26). The central server 62 may then add the manufacturer 64, model number 66, and communications address 68 to a list 70 of closed captioning subscribers. The central server 62 may then send an initial listing 72 of patterns that comprises incorrect or impermissible patterns or combinations of characters. When the closed captioning correction application 30 receives the initial listing 72 of patterns, the closed captioning correction application 30 may store the initial listing 72 of patterns in the database 42 of patterns. The central server 62 may then send an updated listing 74 of patterns, as needed, and the closed captioning correction application 30 stores the updated listing 74 of patterns in the database 42 of patterns. The closed captioning correction application 30 may additionally or alternatively initiate an update according to a time or a calendar. The closed captioning correction application 30, for example, may initiate an update on a periodic basis (e.g., daily, weekly or monthly) or a random basis.

The registration message 60 may also include capability information 80. The correction capabilities described above may be too complicated for some electronic devices 26. Some electronic devices 26, for example, may have limited memory or processing capabilities, so some features of the exemplary embodiments may not be suitable for all electronic devices 26. The registration message 60, then, may also include the capability information 80 that describes the memory and/or computational capabilities of the electronic device 26. The central server 62 and/or the closed captioning correction application 30 may then select and configure the features that suit the capabilities of the electronic device 26. A device with less capabilities, for example, may be configured with lighter-weight features and capabilities, as opposed to a device with more computational resources. The central server 62, as an example, may store or access a table that classifies the electronic device 26 and maps the manufacturer 64 and/or model number 66 to a profile. The profile then determines what features or capabilities are configured for the electronic device 26. If the manufacturer 64 and/or model number 66 are unknown, then a default profile may be applied. Similarly, if the electronic device 26 is upgraded (such as with more memory or processing capabilities), the central server 26 may download or configure the upgraded electronic device 26 with more capabilities. The goal, of course, is to increase the correction capabilities of the electronic device 26, such that even a slight increase in capabilities will result in an increased ability to correct errors in the closed captioning data 36.

Suppose, for example, that the electronic device 26 only has limited capabilities. The processor 28, or the memory 32, may be limited such that only certain errors in the closed captioning data 36 are corrected. The memory 32, for example, may only permit the database 42 of patterns to store the patterns 44 and combinations 46 of characters that describe sequences of the same triple characters (e.g., "aaa," "bbb," and "ccc"). The closed captioning correction application 30, then, would only correct for these triple characters. According to this example, other errors would be ignored or even unrecognized.

Figure 4:
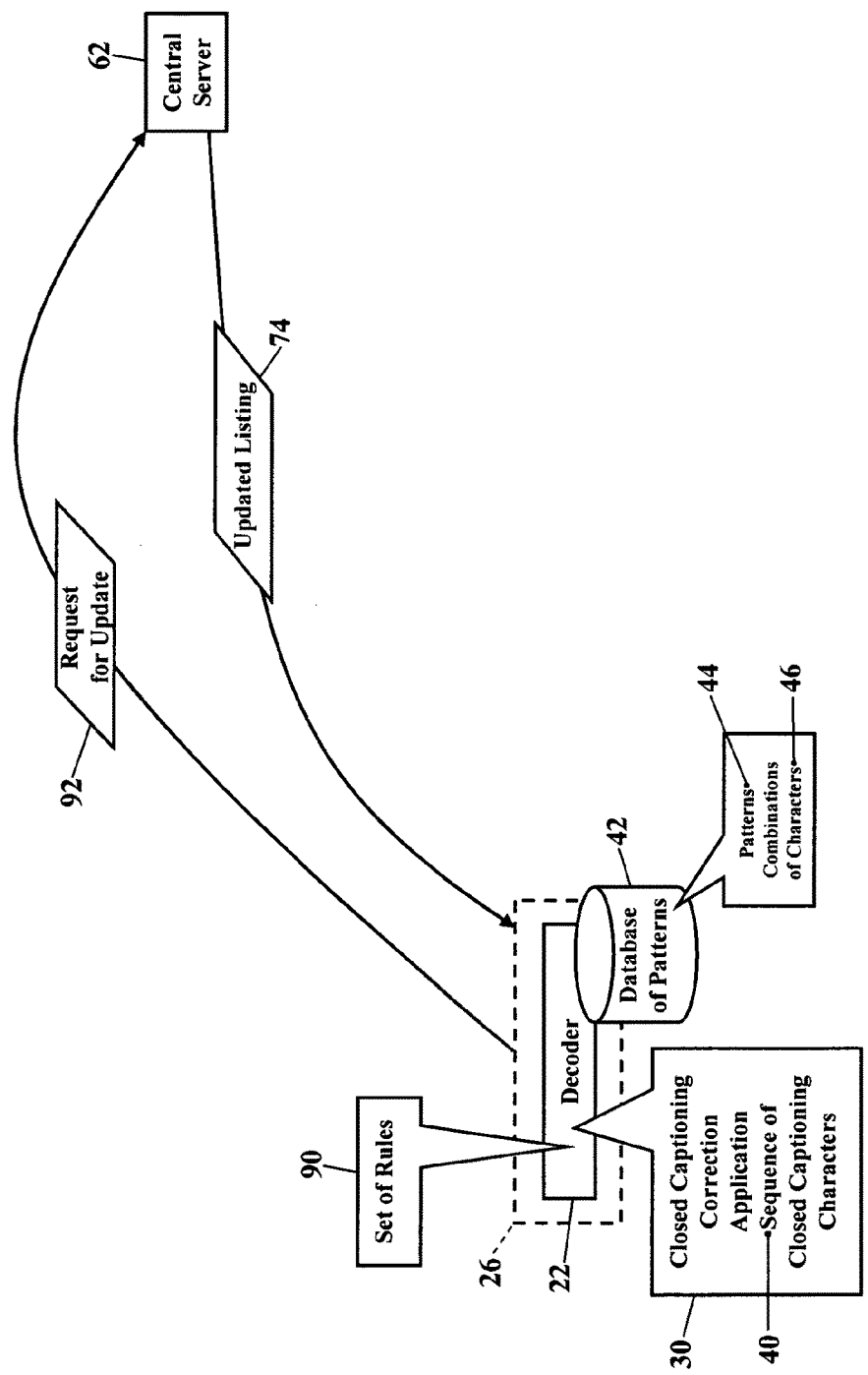
FIG. 4 is a schematic illustrating event-based updates, according to more exemplary embodiments.

FIG. 4 is a schematic illustrating event-based updates, according to more exemplary embodiments. A set 90 of event rules may be stored in memory (e.g., the memory 32) of the electronic device 26. When a rule is satisfied, then the closed captioning correction application 30 may send a request 92 for update to the central server 62. The central server 62 may then respond by sending the updated listing 74 of patterns, and the closed captioning correction application 30 stores the updated listing 74 of patterns in the database 42 of patterns. An unknown pattern, for example, may trigger an update. When the closed captioning correction application 30 encounters a pattern that is not found in the database 42 of patterns, this event may cause the closed captioning correction application 30 to initiate an update. Suppose, for example, that the unknown pattern is not found in a dictionary database, and the unknown pattern is also not found in the database 42 of patterns. If the unknown pattern cannot be identified as a misspelled word, and cannot be identified using the database 42 of patterns, then the unknown pattern may trigger an update. According to exemplary embodiments, the closed captioning correction application 30 sends the request 92 for update to the central server 62, and the central server 62 responds by sending the updated listing 74 of patterns.

Figure 5:
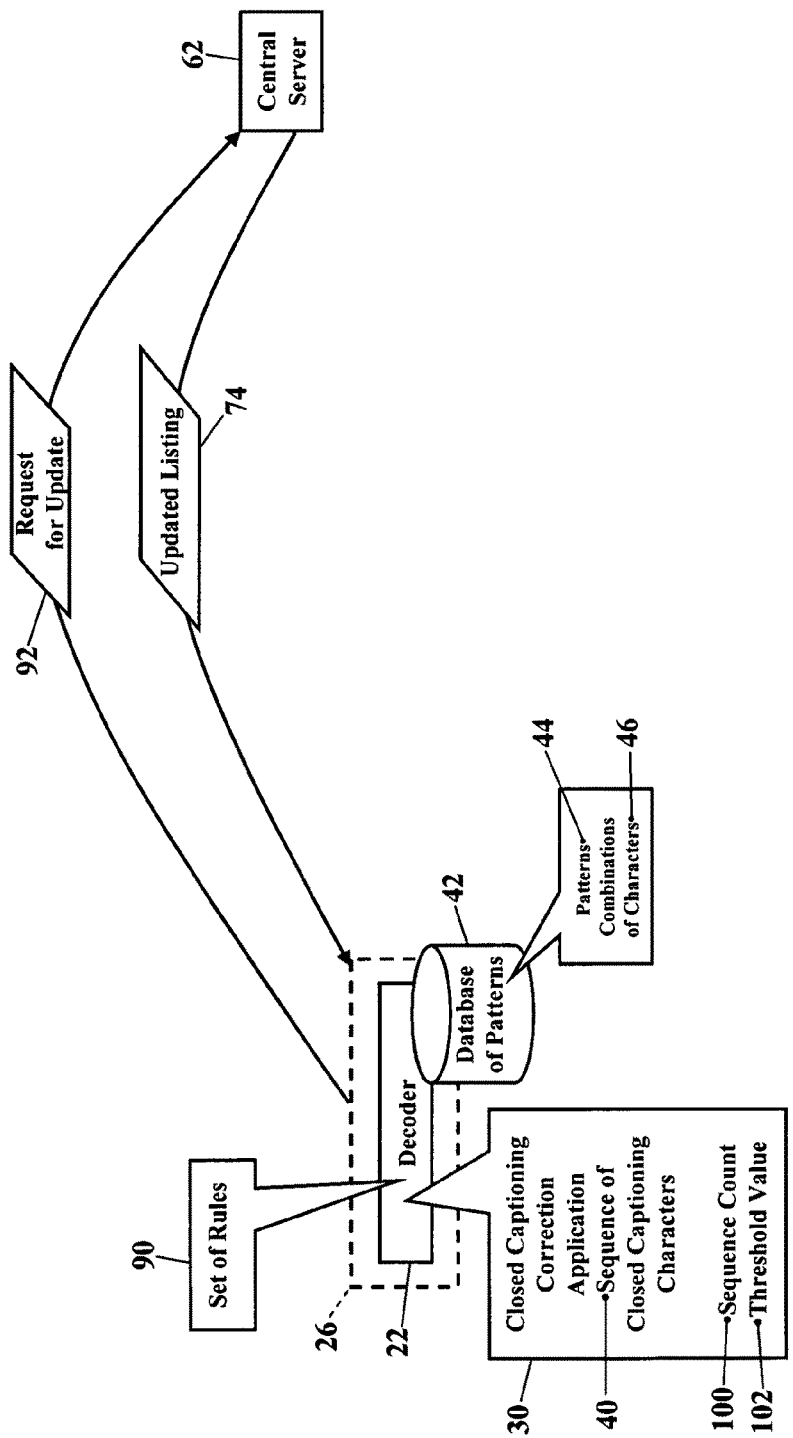
FIG. 5 is a schematic further illustrating the sequence of closed captioning characters, according to more exemplary embodiments.

FIG. 5 is another schematic illustrating event-based updates, according to more exemplary embodiments. Here another rule may require an update after a predetermined number of sequences 40 of closed captioning characters has been analyzed. The closed captioning correction application 30 may maintain a sequence counter 100. The sequence counter 100 has an initial value (such as zero). As each sequence 40 of closed captioning characters is acquired and compared to the database 42 of patterns, the closed captioning correction application 30 may increment the sequence counter 100. With each increment the sequence counter 100 is compared to a threshold value 102. When the sequence counter 100 equals or exceeds the threshold value 102, a rule may cause the closed captioning correction application 30 to send the request 92 for update to the central server 62. After 5000 sequences of closed captioning characters has been analyzed, for example, the closed captioning correction application 30 may initiate an update. The threshold value 102 may be configurable, thus allowing an administrator or user to select the desired number of sequences.

Figure 6:
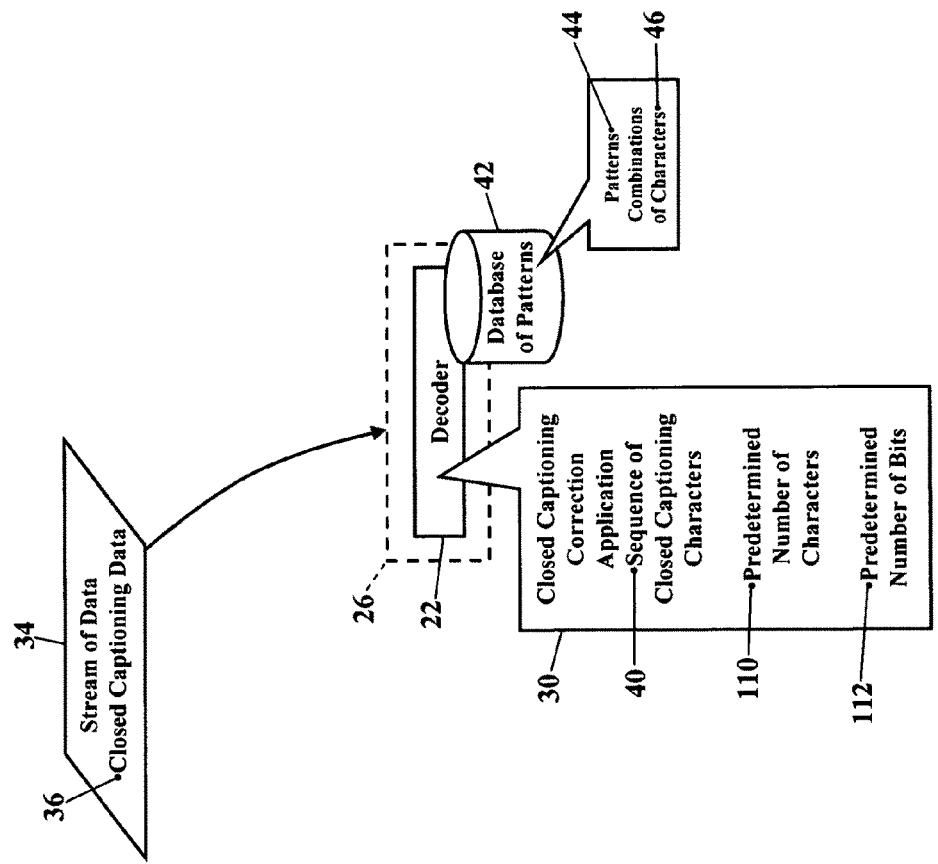
FIG. 6 is another schematic that further illustrates the sequence of closed captioning characters, according to still more exemplary embodiments.

FIG. 6 is a schematic further illustrating the sequence 40 of closed captioning characters, according to more exemplary embodiments. The decoder 22 receives the stream 34 of data and decodes the closed captioning data 36 from the stream 34 of data. The closed captioning correction application 30 then acquires the sequence 40 of closed captioning characters. The sequence 40 of closed captioning characters may be of any size, as measured by bits and/or by textual characters. The sequence 40 of closed captioning characters, for example, may be a predetermined number 110 of sequential characters, such as a sequential string of ten (10), fifty (50), one hundred (100) or more sequential characters. The sequence 40 of closed captioning characters, however, may be a predetermined number 112 of sequential bits of data. The sequence 40 of closed captioning characters is then compared to the entries in the database 42 of patterns. If the sequence 40 of closed captioning characters contains any pattern 44 or combination 46 of characters that is stored in the database 42 of patterns, then the sequence 40 of closed captioning characters is diverted to the syntactical checker (illustrated as reference numeral 50 in FIG. 1) for further processing. Otherwise, the sequence 40 of closed captioning characters is processed for display.

Figure 7:
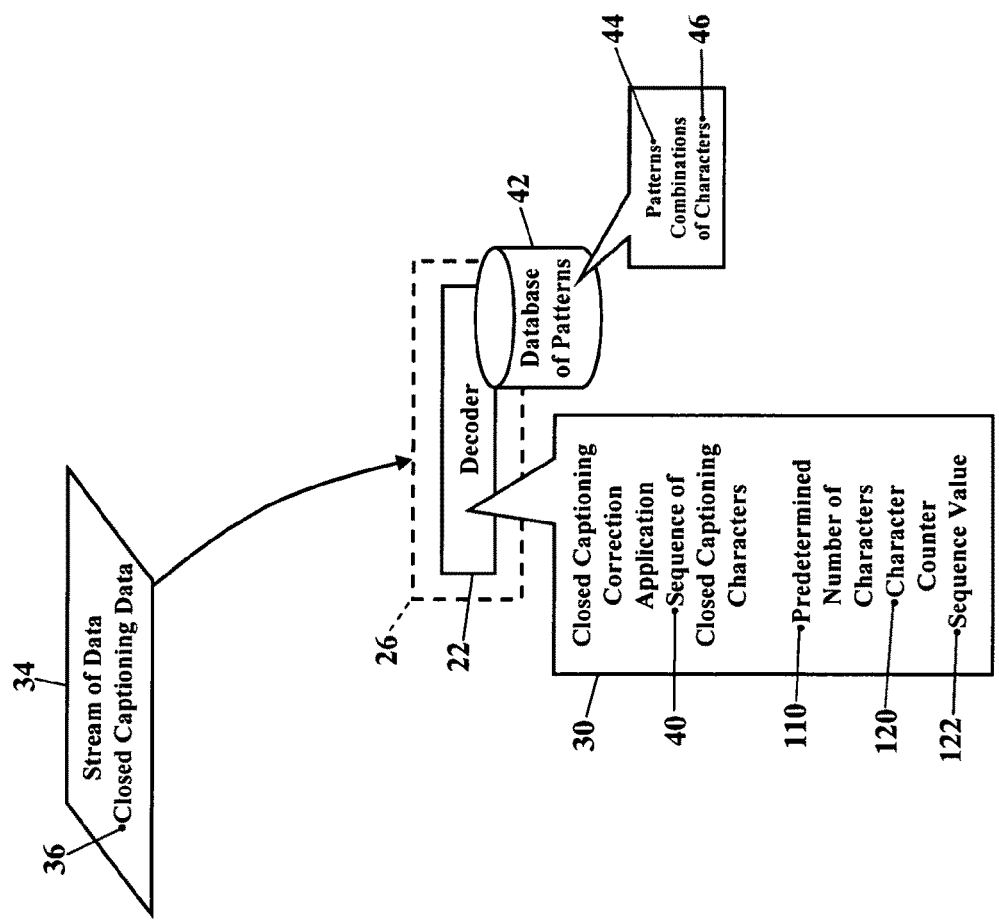
FIG. 7 is a schematic illustrating a character counter, according to more exemplary embodiments.

FIG. 7 is a schematic illustrating a character counter 120, according to more exemplary embodiments. The closed captioning correction application 30 may store and maintain the character counter 120 in memory (e.g., the memory 32). The character counter 120 has an initial value (such as zero). As each character of the closed captioning characters is fetched, the closed captioning correction application 30 may increment the character counter 120. With each increment the character counter 120 is compared to a sequence value 122. When the character counter 120 equals the sequence value 120, the closed captioning correction application 30 may momentarily stop acquiring more characters. The closed captioning correction application 30 may store the acquired characters in the memory 32 as the sequence 40 of closed captioning characters. According to exemplary embodiments, the character counter 120 is then reset to its initial value, and another sequence of closed captioning characters is fetched. As the another sequence of closed captioning characters is fetched, the previously-obtained sequence 40 of closed captioning characters is compared to the entries in the database 42 of patterns, as earlier paragraphs explained.

Figure 8:
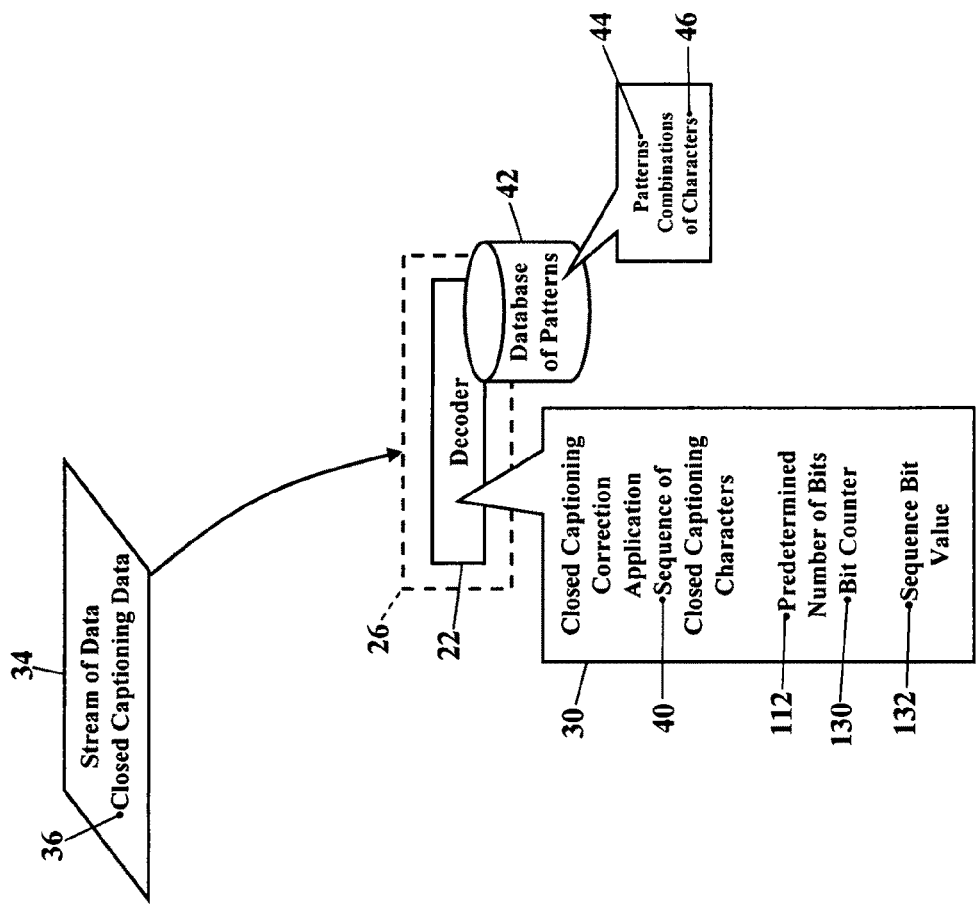
FIG. 8 is a schematic illustrating a bit counter, according to more exemplary embodiments.

FIG. 8 is a schematic illustrating a bit counter 130, according to more exemplary embodiments. The closed captioning correction application 30 may maintain the bit counter 130 in the memory 32. The bit counter 130 has an initial value (such as zero). As each bit of the closed captioning data 36 is acquired, the closed captioning correction application 30 may increment the bit counter 130. With each increment the bit counter 130 is compared to a sequence bit value 132. When the bit counter 130 equals or exceeds the sequence bit value 132, the closed captioning correction application 30 may (or may not) momentarily stop acquiring more bits. According to exemplary embodiments, the bit counter 130 is then reset to its initial value, and another sequence of bits is fetched. The closed captioning correction application 30 may store the acquired bits and compare the sequence of bits to the database 42 of patterns, as earlier paragraphs explained.

Figure 9:
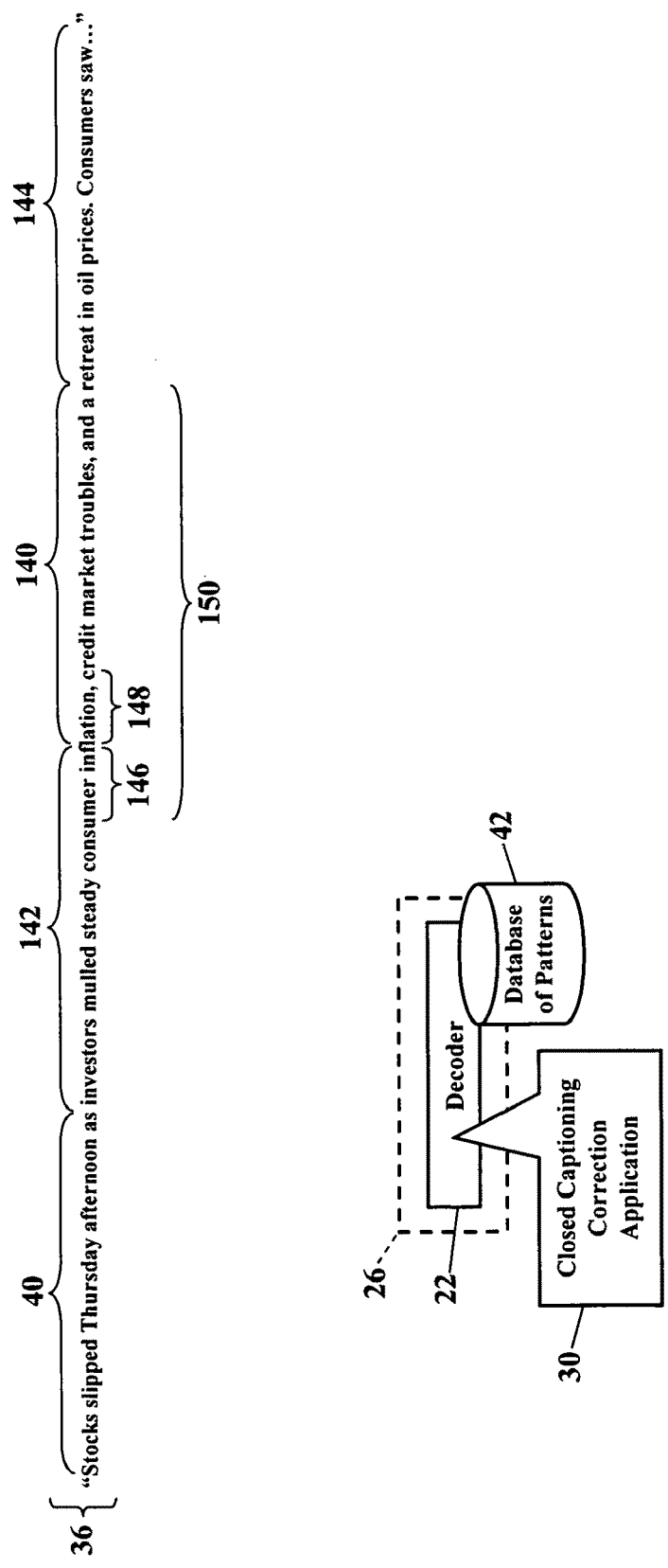
FIG. 9 is another schematic that further illustrates the sequence of closed captioning characters, according to still more exemplary embodiments.

FIG. 9 is another schematic that further illustrates the sequence 40 of closed captioning characters, according to still more exemplary embodiments. Here the closed captioning correction application 30 may acquire or fetch additional characters from preceding and/or from subsequent sequences 40 of closed captioning characters. These additional characters are then used to augment the correction processes. As FIG. 9 illustrates, the closed captioning data 36 may comprise multiple sequences of closed captioning characters. A middle, or reference, sequence 140 of closed captioning characters is flanked by a preceding sequence 142 and by a subsequent sequence 144. The preceding sequence 142 precedes the middle sequence 140 of closed captioning characters in both time and in context. The subsequent sequence 144 succeeds the middle sequence 140 of closed captioning characters in both time and in context. Here, then, for any individual sequence of closed captioning characters, the closed captioning correction application 30 may also fetch and store the immediately preceding sequence 142 and the immediately subsequent sequence 144 of closed captioning characters.

The closed captioning correction application 30 may then create extended sequences. The closed captioning correction application 30, for example, may store a predetermined number 146 of trailing characters from the preceding sequence 142 of closed captioning characters. These trailing characters may be the last few or several characters from the tail or end of the preceding sequence 142 of closed captioning characters. The predetermined number 146 of trailing characters may be configurable, thus allowing an administrator or user to select the actual number. The predetermined number 146 of trailing characters may then be appended to a beginning 148 of the middle sequence 140 of closed captioning characters to create an extended sequence 150 of closed captioning characters. The closed captioning correction application 30 may then query the database 42 of patterns for the extended sequence 150 of closed captioning characters, as earlier paragraphs explained.

Figure 10:
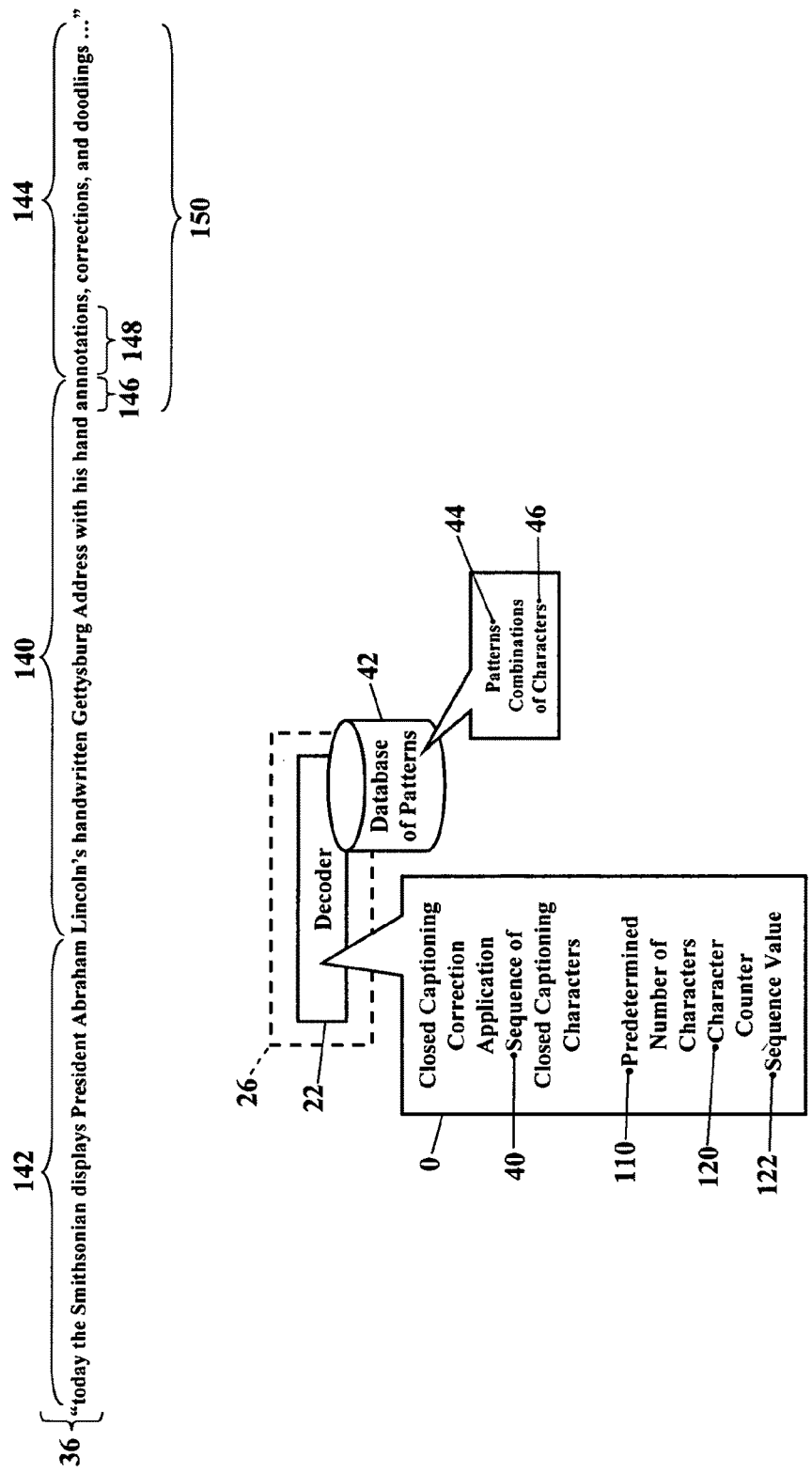
FIGS. 10 and 11 are schematics illustrating an extended sequence of closed captioning characters, according to still more exemplary embodiments.

FIG. 10 is another schematic illustrating the extended sequence 150 of closed captioning characters, according to still more exemplary embodiments. As FIG. 10 illustrates, the extended sequence 150 of closed captioning characters helps identify patterns. Because each sequence 40 of closed captioning characters comprises the predetermined number 110 of sequential characters (or the predetermined number 112 of sequential bits), some character or bit patterns may be truncated, split, and/or divided between two sequences. Suppose, for example, the closed captioning data 36 includes the phrase "today the Smithsonian displays President Abraham Lincoln's handwritten Gettysburg Address with his hand annnotations, corrections, and doodlings." In this phrase, the word "annnotations" has been incorrectly transcribed. The closed captioning correction application 30 may parse that phrase into multiple sequential sequences, with unintended consequences. Suppose, for example, the phrase is parsed as "today the Smithsonian displays President Abraham," "Lincoln's handwritten Gettysburg Address with his ann," and "notations, corrections, and doodlings." In this example, then, the incorrectly-transcribed word "annnotations" has been split between two sequential phrases (the middle sequence 140 and the subsequent sequence 144). Notice, though, that the middle sequence 140 ("Lincoln's handwritten Gettysburg Address with his hand ann") and the subsequent sequence 144 ("notations, corrections, and doodlings") may not contain an unusual pattern. That is, the incorrectly-transcribed word "annnotations" has been divided into "ann" and "notations," both of which are correct spellings for different words ("ann" and "notations"). (As later paragraphs will explain, "ann" may be flagged for an error in capitalization, but "ann" may not be considered an incorrect pattern of characters.) Because the incorrectly-transcribed word "annnotations" has been divided between adjacent sequences, the incorrect triple "nnn" may not be flagged as an incorrect pattern.

Exemplary embodiments, then, may borrow and augment. The closed captioning correction application 30 may append the predetermined number 146 of trailing characters from the preceding, middle sequence 140 to the beginning 148 of the subsequent sequence 144 of closed captioning characters. By treating the predetermined number 146 of trailing characters as a prefix to the subsequent sequence 144 of closed captioning characters, the resulting extended sequence 150 helps reduce occurrences of split, incorrect patterns. Returning to the above example, the trailing characters "ann" may be appended to create the extended sequence "annnotations, corrections, and comments." Here, then, exemplary embodiments would query the database 42 of patterns for the incorrect sequence of triple "nnn" letters (or bits).

Figure 11:
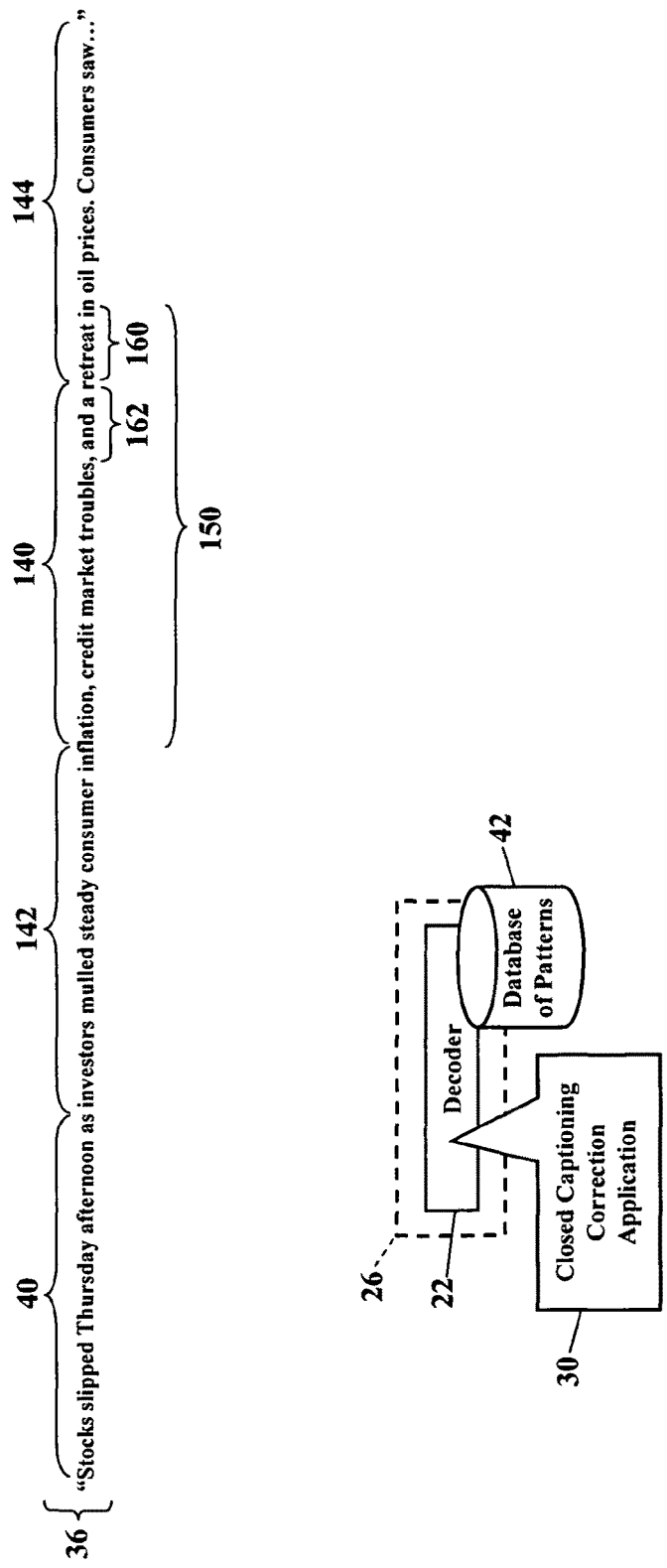

FIG. 11 is yet another schematic illustrating the extended sequence 150 of closed captioning characters, according to yet more exemplary embodiments. Here the closed captioning correction application 30 may store and augment leading characters (or bits). FIG. 11 again illustrates the preceding sequence 142, the middle sequence 140, and the subsequent sequence 144. Here, though, the closed captioning correction application 30 may fetch, store, and/or borrow a predetermined number 160 of leading characters from the subsequent sequence 144 of closed captioning characters. These leading characters may be the first few or several characters from the head or beginning of the subsequent sequence 144 of closed captioning characters. The predetermined number 160 of leading characters may again be configurable to be any value that is desired. The predetermined number 160 of leading characters is then appended to an end 162 of the middle sequence 140 of closed captioning characters to create the extended sequence 150 of closed captioning characters. The predetermined number 160 of leading characters are thus treated as a suffix to the middle sequence 140 of closed captioning characters. The closed captioning correction application 30 may then query the database 42 of patterns for the extended 150 sequence of closed captioning characters, as earlier paragraphs explained.

Exemplary embodiments may also discard characters. As FIGS. 9-11 illustrate, exemplary embodiments need not store and retain all characters from the preceding sequence 142. Once the preceding sequence 142 of closed captioning characters has been compared to the database 42 of patterns, the closed captioning correction application 30 need only retain the predetermined number 146 of trailing characters. Because only the predetermined number 146 of trailing characters is appended to the beginning 148 of the middle sequence 140 of closed captioning characters, the remaining characters from the preceding sequence 142 of closed captioning characters may be unneeded. Storage capacity in the memory 32 may then be increased, or conserved, by discarding or deleting the remaining characters from the preceding sequence 142 of closed captioning characters. If the preceding sequence 142 of closed captioning characters has been compared to the database 42 of patterns, and after the predetermined number 146 of trailing characters has been identified and stored, then exemplary embodiments may delete the remaining characters from the preceding sequence 142. After the extended sequence 150 has been created by prefixing the predetermined number 146 of trailing characters to the middle sequence 140 of closed captioning characters, then exemplary embodiments may delete the predetermined number 146 of trailing characters.

Exemplary embodiments may also discard leading characters. The predetermined number 160 of leading characters is appended to the middle sequence 140 of closed captioning characters to create the extended sequence 150 of closed captioning characters, as FIG. 11 illustrated. Because the subsequent sequence 144 of closed captioning characters is stored in the memory 32, once the extended sequence 150 is created, the predetermined number 160 of leading characters is no longer needed in storage. Storage capacity in the memory 32, then, may be increased, or conserved, by discarding or deleting the leading characters. So, if the subsequent sequence 144 of closed captioning characters has been acquired and stored, and if the predetermined number 160 of leading characters has been appended to the middle sequence 140 of closed captioning characters, then exemplary embodiments may delete the leading characters from the memory 32.

Exemplary embodiments additionally or alternatively acquire randomly-sized sequences of closed captioning characters. The above paragraphs discuss that the character counter 120 may determine a fixed size for each sequence 36 of closed captioning characters. Exemplary embodiments, however, may fetch or acquire randomly-sized sequences 36 of closed captioning characters. Exemplary embodiments, for example, may sample on a per-character basis, on per-word basis (e.g., by observing or recognizing blank spaces in the closed captioning data 36). Exemplary embodiments may also sample based on a fixed sub-sentence basis (based on thresholds) and/or based on a variable sub-sentence basis (e.g., observing or recognizing blank spaces). Exemplary embodiments may also sample based on whole sentences, such as observing or recognizing blank spaces, punctuation (e.g., period, question mark, exclamation point), and capital letters. A period followed by a capital letter (e.g., ". T . . . "), for example, may indicate a new sentence. Observing or recognizing whole sentences help ensure the correct tense of verbs in the sentence and may be consistently used. These randomly-sized sequences 36 of closed captioning characters may also be extended with leading and/or trailing characters from previous and/or subsequent sequences, as the above paragraphs explained.

Figure 12:
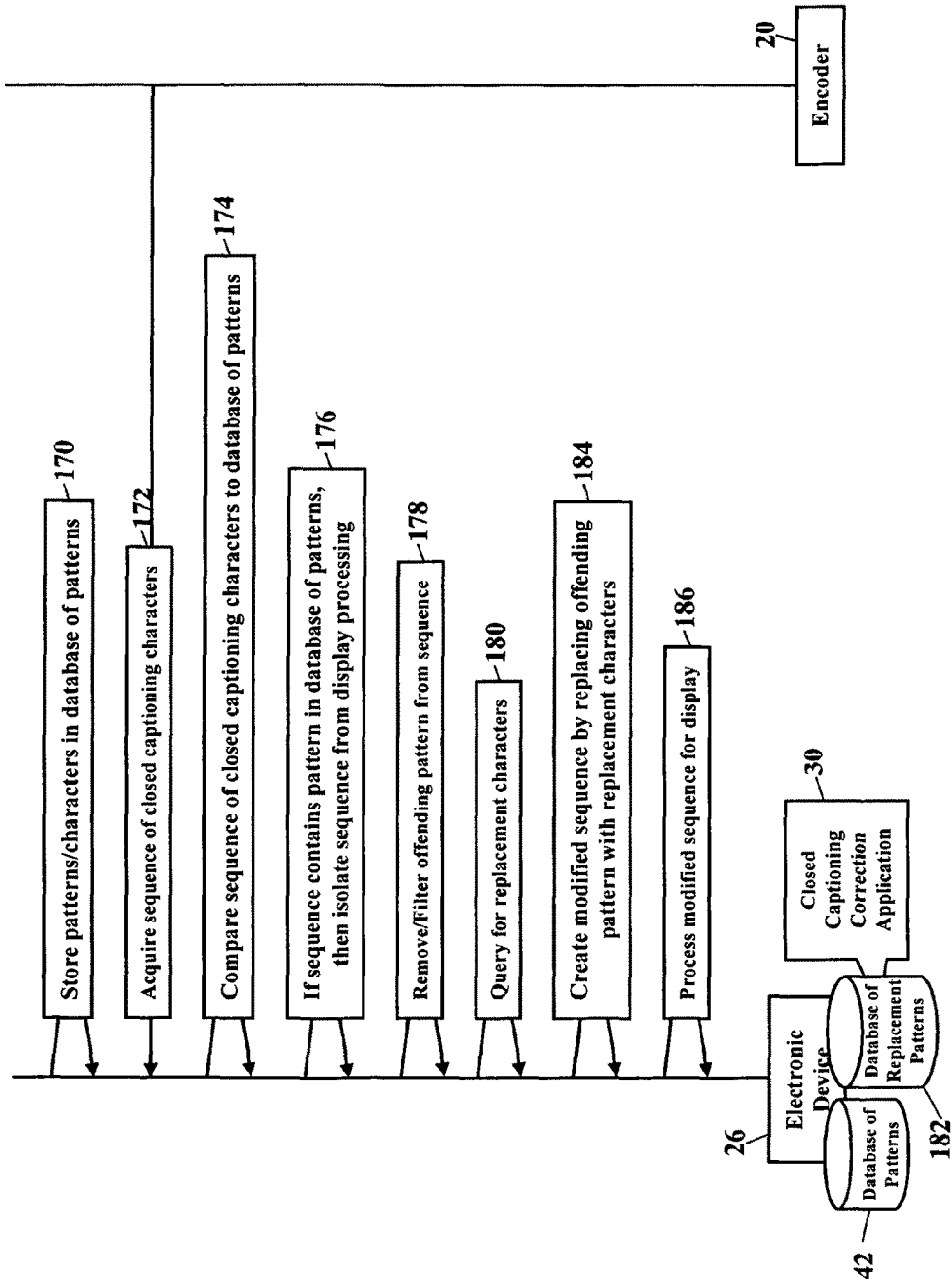
FIG. 12 is a schematic illustrating a process for correcting errors in closed captioning data, according to more exemplary embodiments.

FIG. 12 is a schematic illustrating a process for correcting errors in the closed captioning data 36, according to more exemplary embodiments. The database 42 of patterns may store patterns of characters representing syntactical errors (Block 170). These patterns of characters, for example, may be combinations of ASCII characters that are impermissible. A triple "nnn" in the closed captioning data 36, for example, may be impermissible. The database 42 of patterns, in fact, may store hundreds or thousands of incorrect patterns and/or combinations of characters that violate established syntactical canons and rules. The database 42 of patterns may store "nonsense" patterns and combinations, such as "mski," "kh%&," that are not likely accepted usage. The database 42 of patterns may even store multiple patterns and/or character combinations from multiple languages, thus correcting multilingual closed captioning data 36. Again, though, the capabilities of the electronic device 26 may determine the number of incorrect patterns and/or combinations of characters that are stored in the database 42 of patterns. When the sequence 40 of closed captioning characters is acquired (Block 172), the sequence 40 is compared to the database 42 of patterns (Block 174). If the sequence 40 of closed captioning characters contains a pattern in the database 42 of patterns, then the sequence 40 of closed captioning characters is isolated from display processing (Block 176).

Exemplary embodiments may remove and/or replace offending patterns. When the sequence 40 of closed captioning characters contains an offending pattern (found in the database 42 of patterns), the identified, offending pattern may then be removed or filtered from the sequence 40 of closed captioning characters (Block 178). A query may be also made for replacement characters (Block 180). That is, the offending pattern may be replaced with an acceptable replacement pattern. A database 182 of replacement patterns may store replacement patterns or combinations of characters. The database 182 of replacement patterns is illustrated as being locally stored in the electronic device 26, but the database 182 of replacement patterns may be remotely accessible. The database 182 of replacement patterns is queried for a replacement pattern. Exemplary embodiments may then create a modified sequence of closed captioning characters by replacing the offending pattern of closed captioning characters with the replacement characters (Block 184). The modified sequence of closed captioning characters may then be processed for display (Block 186).

Exemplary embodiments may access and use corrective rules. As the above paragraph explained, an offending pattern may be replaced with a replacement pattern. When the database 182 of replacement patterns is queried, the database 182 of replacement patterns may store one or more corrective rules. These corrective rules describe how an offending pattern is corrected or replaced. When a sequence of three (or more) identical characters is observed or fetched, for example, a rule may require deletion of characters until only a pair of identical characters remains. If a word (as identified by a preceding and ending or subsequent blank space) contains a non-alphabetical letter character (e.g., "%," "#," or "!"), then another may require removal of the non-letter character. The non-letter character may alternatively be replaced with a blank space, depending on how the closed captioning correction application 30 is configured and/or depending on what rules are downloaded to the electronic device 26.

Exemplary embodiments, however, may require a training period or process. Sometimes a correction may be wrong. Even though identical, triple characters may be replaced with an identical pair, perhaps only a single character was needed. Likewise, a non-alphabetical letter character (e.g., "%," "#," or "!") may have been intended and mistakenly replaced with a space. Exemplary embodiments, then, may sometimes correct in the wrong manner. To reduce or alleviate these wrong corrections, exemplary embodiments may implement training period or process that allows for updates of the rules are refined. A service provider, or the closed captioning correction application 30, may learn over time how offending patterns are corrected. Exemplary embodiments, then, may evolve with time and usage to refine the correction of the closed captioning data 36.

Figure 13:
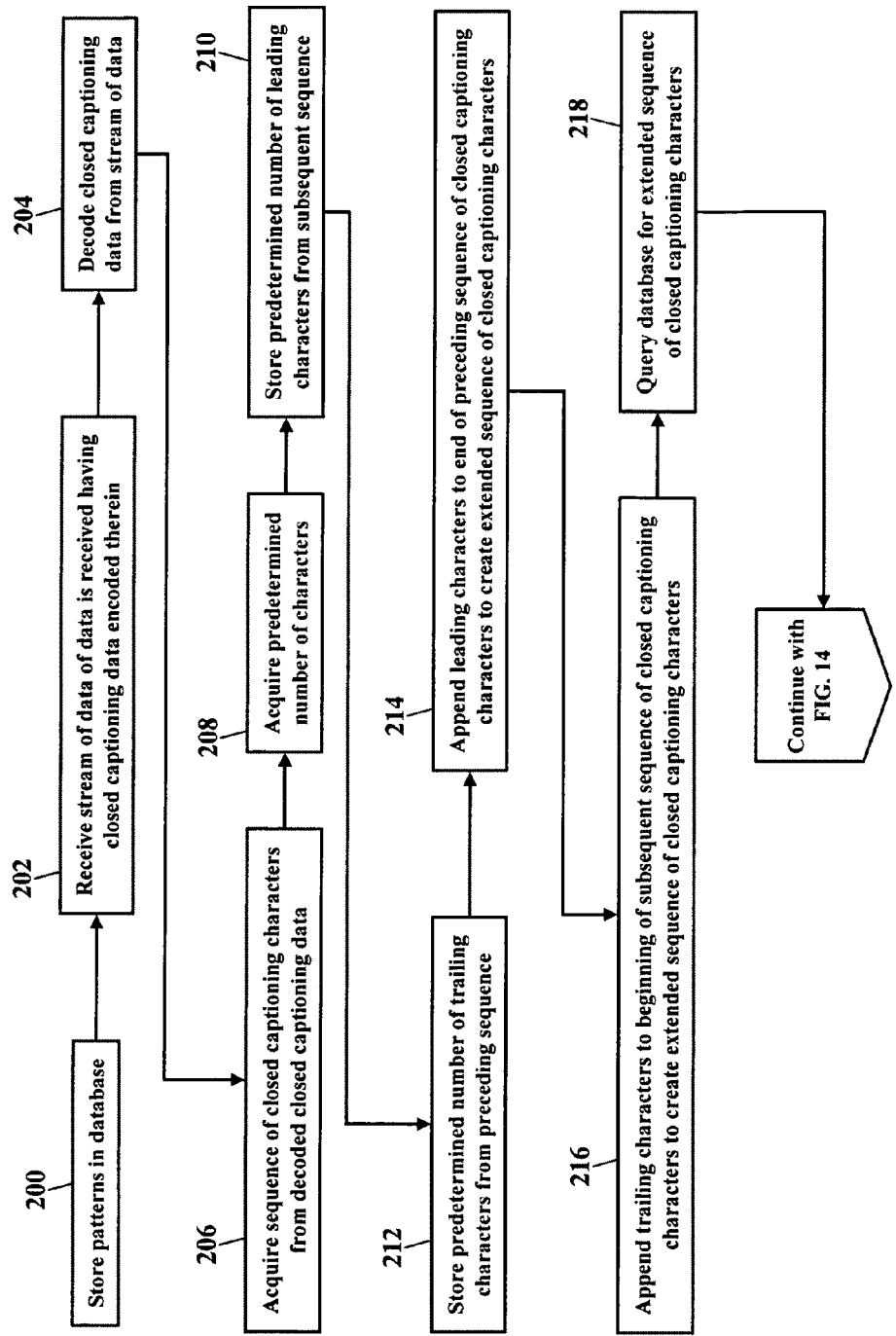
FIGS. 13-15 are flowcharts illustrating a method of correcting the closed-captioning data 36, according to more exemplary embodiments.
Figure 14:
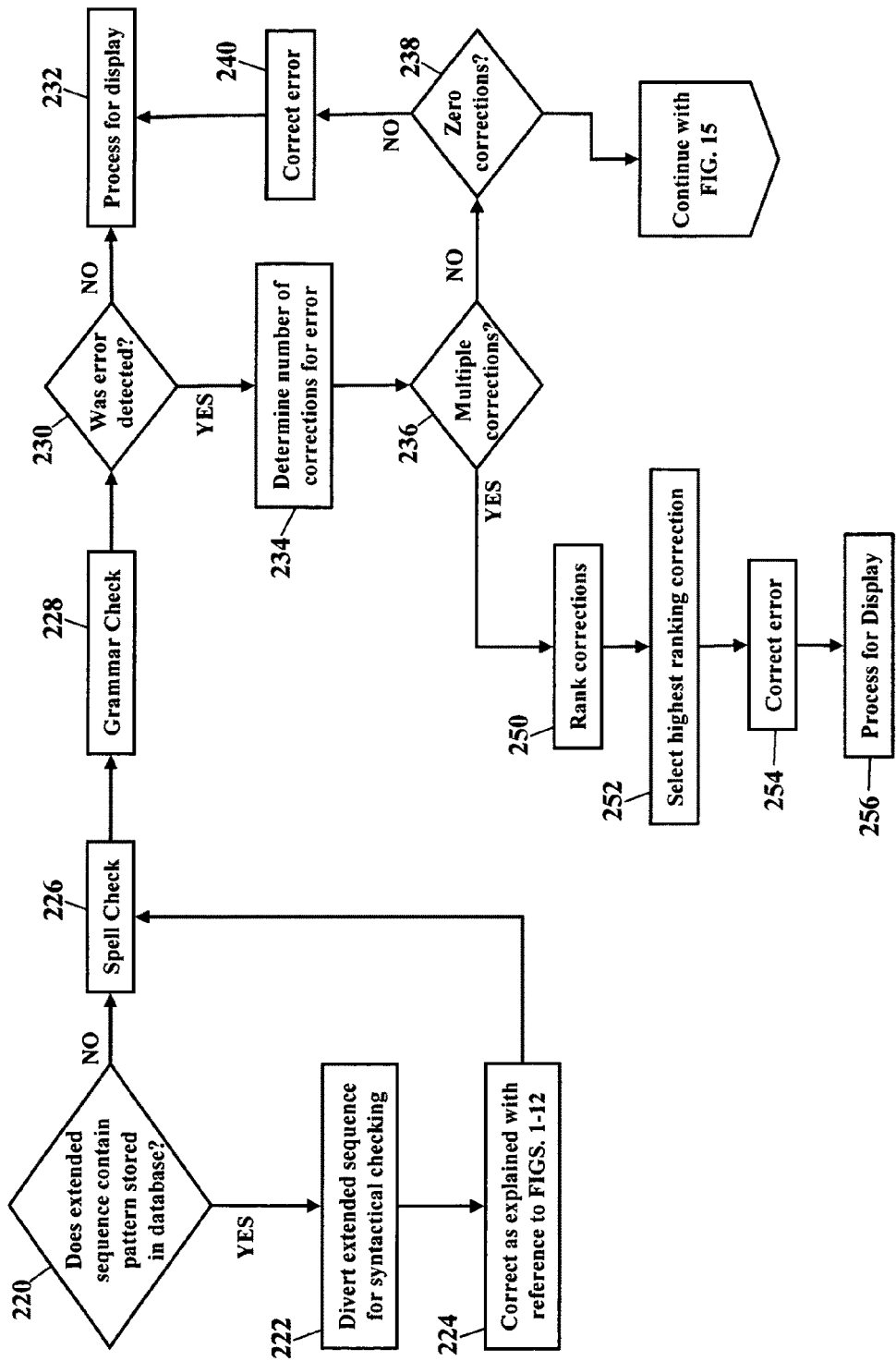
Figure 15:
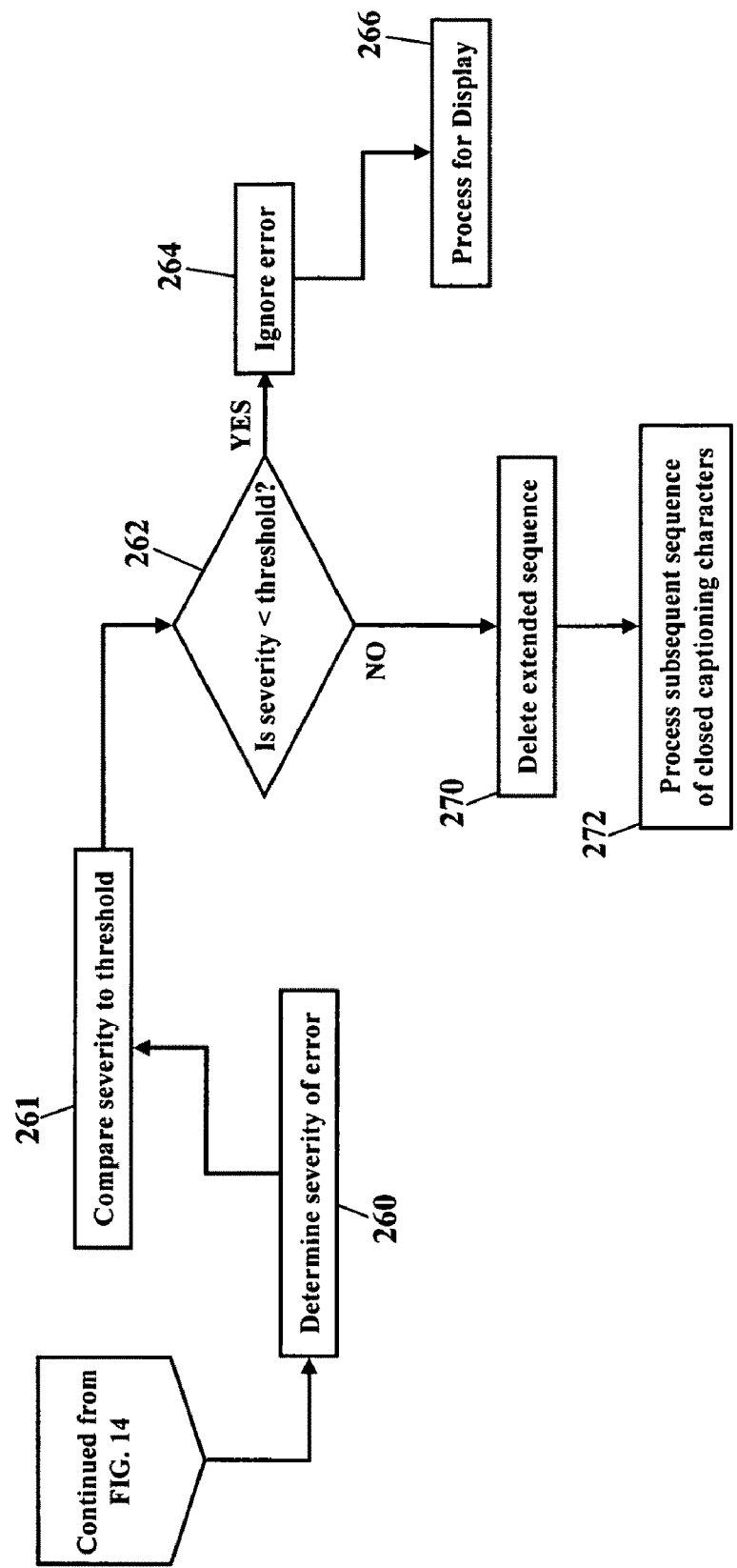

FIGS. 13-15 are flowcharts illustrating a method of correcting the closed-captioning data 36, according to more exemplary embodiments. Patterns of closed captioning characters are stored in a database (Block 200). The stream 34 of data is received having the closed captioning data 36 encoded therein (Block 202). The closed captioning data 36 is decoded from the received stream 34 of data (Block 204). The sequence 40 of closed captioning characters is acquired from the decoded closed captioning data (Block 206). The sequence 40 of closed captioning characters may be a sequential string or list of characters. The sequence 40 of closed captioning characters may be acquired as a predetermined number of sequential characters (Block 208) from the decoded closed captioning data 36. A predetermined number of leading characters from a subsequent sequence may also be stored (Block 210). A predetermined number of trailing characters from a preceding sequence may also be stored (Block 212). The predetermined number of leading characters may be appended to an end of a preceding sequence of closed captioning characters to create the extended sequence 150 of closed captioning characters (Block 214). The predetermined number of trailing characters may be appended to a beginning of the subsequent sequence of closed captioning characters to also create the extended sequence 150 of closed captioning characters (Block 216). The database 42 of patterns is then queried for the extended sequence 150 of closed captioning characters (Block 218).

The flowchart continues with FIG. 14. If the extended sequence 150 of closed captioning characters contains a pattern that is stored in the database 42 of patterns (Block 220), then the extended sequence 150 of closed captioning characters is diverted for syntactical checking (Block 222) and corrected as explained above with reference to FIGS. 1-12 (Block 224). If, however, the extended sequence 150 of closed captioning characters fails to contain any patterns that are stored in the database 42 of patterns (Block 220), then the extended sequence 150 of closed captioning characters may be spell-checked (Block 226) and grammar-checked (Block 228) for errors. Likewise, the corrected, extended sequence 150 of closed captioning characters (Block 224) may also be spell-checked (Block 226) and grammar-checked (Block 228) for errors. If an error is not detected (Block 230), then the extended sequence 150 of closed captioning characters is processed for display (Block 232). If, however, an error is detected (Block 230), then exemplary embodiments may determine how many corrections are possible for each error (Block 234). When, for example, a misspelled word is located, exemplary embodiments determine how many alternate words may be substituted for the misspelled word. If multiple corrections are not available (Block 236), and if only one (1) correction is available for an error (Block 236), then the error is corrected (Block 240) and the corrected sequence of closed captioning characters is processed for display (Block 232).

If, however, multiple spelling and/or grammar corrections are determined for an error (Block 236), then the multiple corrections are ranked according to usage rules (Block 250). In other words, if more than one (1) correction is available for an error, then the multiple corrections are scored and ranked according to usage rules. Exemplary embodiments may then automatically select a correction that is highest ranked (Block 252). The error is corrected (Block 254) and the corrected sequence of closed captioning characters is processed for display (Block 256).

If an error is detected (Block 230 of FIG. 14), and if the number of corrections is zero (Block 238 of FIG. 14), i.e., meaning the correction is unknown, then the flowchart continues with FIG. 15, where a severity of the error may be determined (Block 260). A numerical score of the severity, for example, may be calculated by evaluating a set of grammatical and/or spelling rules. The determined severity is then compared to a threshold (Block 261). When the severity is below a threshold (Block 262), then the error may be ignored (Block 264) and the extended sequence 40 of closed captioning characters is processed for display (Block 266). If, however, the severity of the error is equal to or greater than the threshold (Block 262), then the extended sequence 40 of closed captioning characters is deleted and not processed for display (Block 270). The severely-erred extended sequence 40 of closed captioning characters, then, may be entirely discarded and, instead, the subsequent sequence 144 of closed captioning characters is processed (Block 272).

Error counts may also be maintained. As the above paragraphs explained, when an error is detected (e.g., Block 230 of FIG. 14), and when the number of corrections is zero (Block 238 of FIG. 14), then a correction is unknown. In other words, an erroneous or offensive pattern cannot be corrected (perhaps because the closed captioning correction application 30 cannot determine a correction). Here, then, exemplary embodiments may maintain an error count. The closed captioning correction application 30, for example, may instruct the processor 28 to send an error message to a fault management system. The error message may be sent in real time as the error is determine (e.g., synchronous reporting) or at a later time (asynchronous reporting). The fault management system may try to resolve the error, create trend reports, and/or take action on behalf of the electronic device 26. The fault management system may even take action on behalf of all registered devices, so that all the registered devices benefit from the correction.

Figure 16:
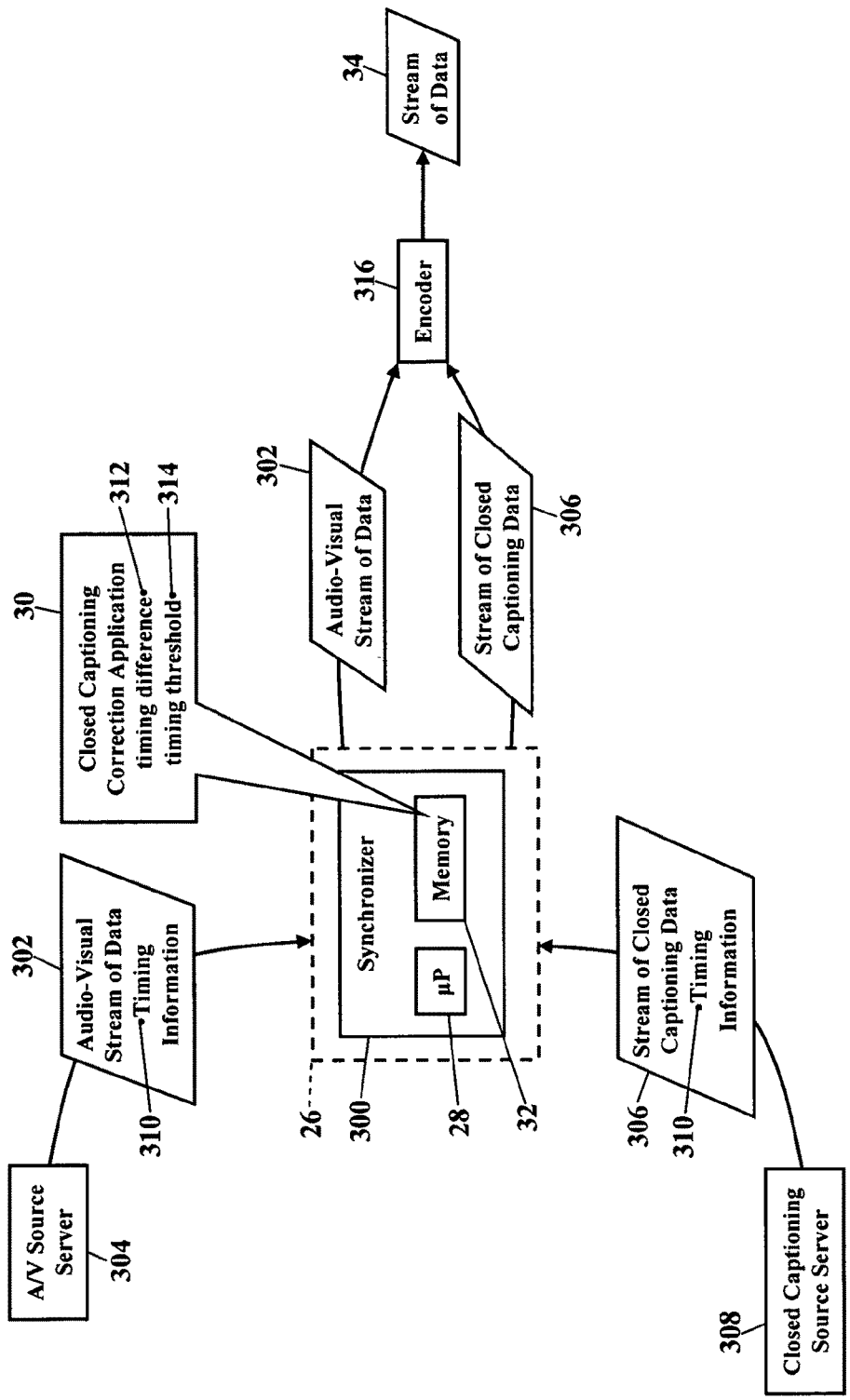
FIG. 16 is another schematic illustrating the closed captioning correction application, according to more exemplary embodiments.

FIG. 16 is another schematic illustrating the closed captioning correction application 30, according to more exemplary embodiments. Here the closed captioning correction application 30 operates within a synchronizer 300 to correct synchronization errors in closed captioning data. As this disclosure previously explained, closed captioning text may become out-of-synch with the spoken words. When the closed captioning text leads or lags the spoken words, a viewer's comprehension may be reduced. Exemplary embodiments, then, may correct synchronization errors between the spoken, audible words and the textual, closed captioning data. The synchronizer 300, then, helps correct and reduce synchronization errors.

FIG. 16 illustrates the synchronizer 300, according to exemplary embodiments. The synchronizer 300 is illustrated as a component of the electronic device 26, such as a computer/server, multiplexer, television, or a set-top box. The synchronizer 300 may receive an audio-visual stream 302 of data from an A/V source server 304. The audio-visual stream 302 of data may be an analog or digital television signal. The audio-visual stream 302 of data may be formatted according to the National Television Standards Committee (NTSC) and/or to the Society of Motion Picture and Television Engineers (SMPTE) serial digital bit stream standards. The audio-visual stream 302 of data may be a digital, standard definition signal or a high-definition signal. The audio-visual stream 302 of data may be formatted according to any of the Electronic Industries Alliance (EIA) standards (such as EIA-608 and/or EIA-708). The audio-visual stream 302 of data may additionally or alternatively be formatted according to any of the Advanced Television Systems Committee (ATSC) formats (such as A/53 and A/54). However the audio-visual stream 302 of data is formatted, all these standards are well known to those of ordinary skill in the art and, thus, not further discussed.

The synchronizer 300 may also receive a separate stream 306 of closed captioning data. The stream 306 of closed captioning data may be received from a closed captioning source server 308 operated by, or on behalf of, a closed captioning provider. As the synchronizer 300 receives and/or processes the audio-visual stream 302 of data and the stream 306 of closed captioning data, the closed captioning correction application 30 compares timing information 310 contained within each stream 302 and 306. The timing information 310 allows the closed captioning correction application 30 to determine if a synchronization error is present. The timing information 310, for example, may be time stamps or markers that are embedded within the audio-visual stream 302 of data and the stream 306 of closed captioning data. There are, in fact, many known methods or techniques of determining a lead or lag condition between the audio-visual stream 302 of data and the stream 306 of closed captioning data, so this disclosure will not further discuss the known concepts. Regardless, exemplary embodiments may compare any observed timing difference 312 to a synchronization threshold 314. When the timing difference 312 equals or exceeds the synchronization threshold 314, then the closed captioning correction application 30 may make a correction. The closed captioning correction application 30, for example, may instruct the processor 28 to synchronize the streams 302 and 306 in time. Once the audio-visual stream 302 of data and the stream 306 of closed captioning data are synchronized, the synchronizer 300 may then output synchronized versions of each stream 302 and 306. An encoder 316 may then receive the synchronized streams 302 and 306, and the encoder 316 encodes the stream 306 of closed captioning data into the audio-visual stream 302 of data, as is known. The encoder 316 produces the stream 34 of data having the closed captioning data 36 encoded therein (as FIGS. 1-15 discuss).

Figure 17:
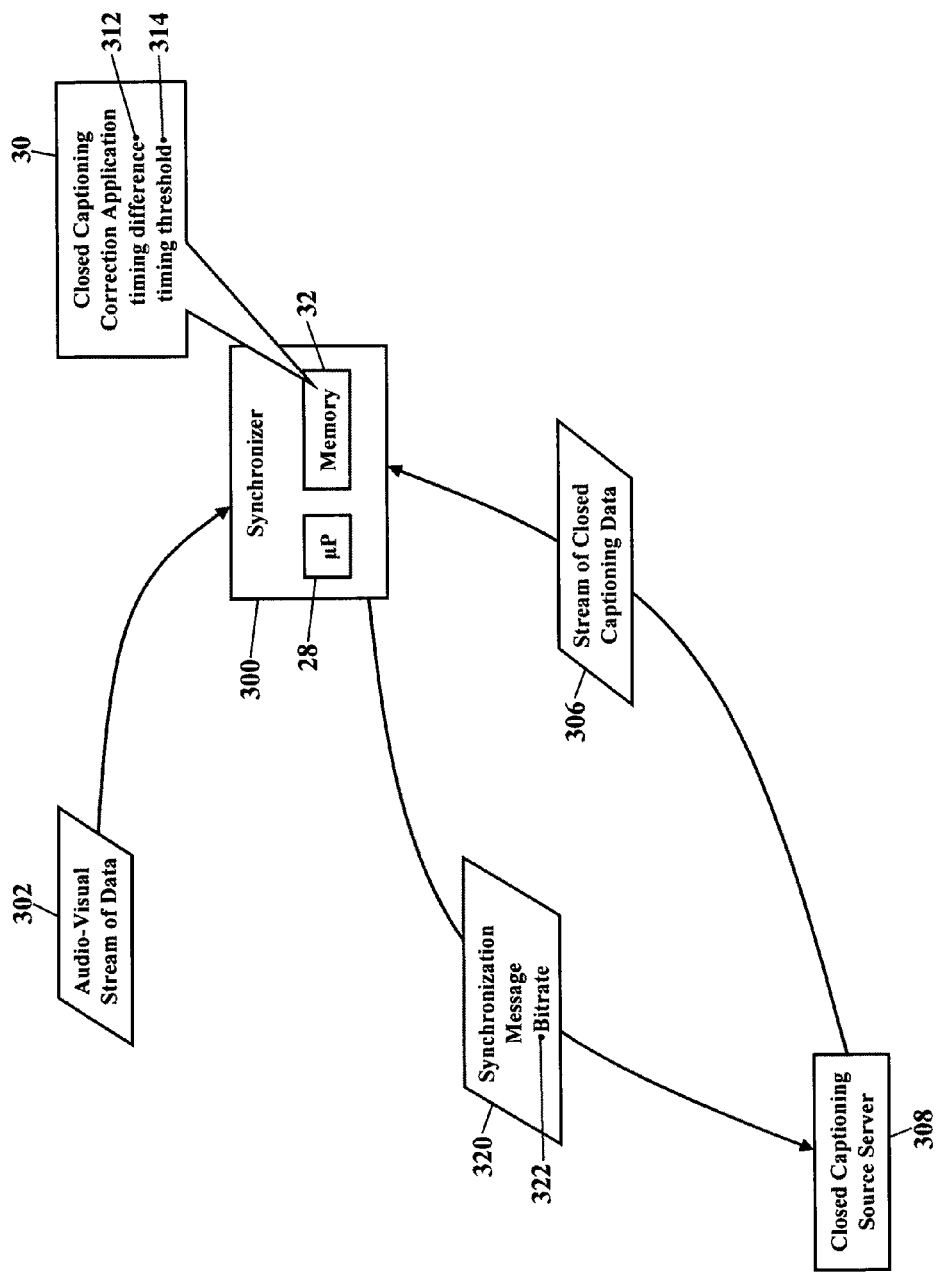
FIGS. 17 and 18 are more schematics illustrating the closed captioning correction application, according to more exemplary embodiments.
Figure 18:
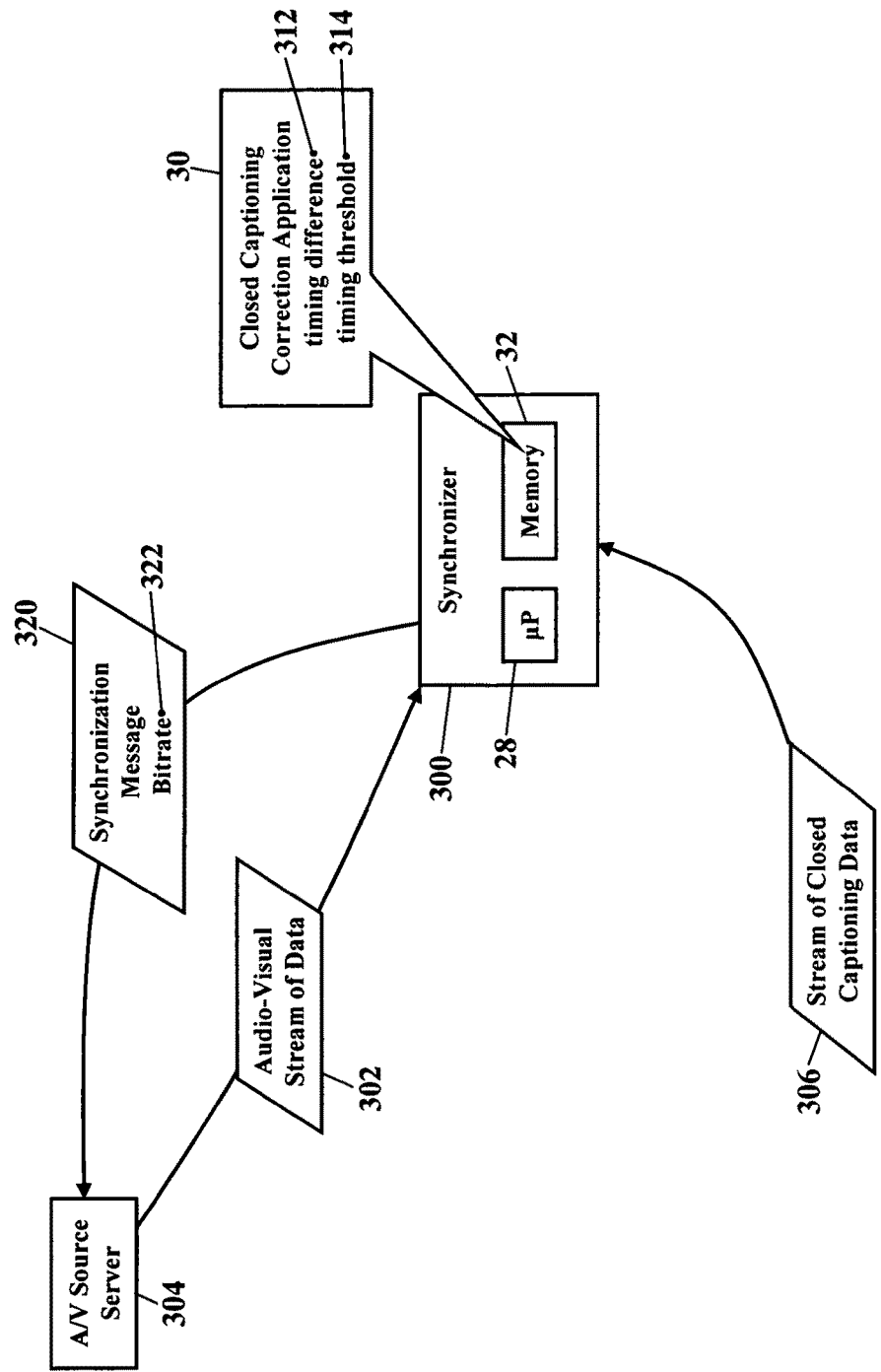

FIGS. 17 and 18 are more schematics illustrating the closed captioning correction application 30, according to more exemplary embodiments. Here the closed captioning correction application 30 instructs the closed captioning source server 308 to continuously source, or send, the stream 306 of closed captioning data. That is, the closed captioning correction application 30 causes the processor 28 to send a synchronization message 320 to the closed captioning source server 308. The synchronization message 320 communicates via the communications network (illustrated as reference numeral 24 in FIG. 1). The synchronization message 320 instructs the closed captioning source server 308 to send or transmit the stream 306 of closed captioning data at a pre-defined bitrate 322. When the closed captioning correction application 30 determines that a synchronization correction is desired (based on the synchronization threshold 314, discussed above), the closed captioning correction application 30 may determine or calculate what bitrate 322 is needed to reduce or rectify the synchronization error. That is, the closed captioning correction application 30 may calculate what bitrate 322 increase, or decrease, is needed in either the audio-visual stream 302 of data and/or the stream 306 of closed captioning data. Should the stream 306 of closed captioning data, for example, lag the audio-visual stream 302 of data by one second, then the closed captioning correction application 30 may calculate what increase in the bitrate 322 of the stream 306 of closed captioning data is needed to compensate for the synchronization error. The closed captioning source server 308 may thus be instructed to send or feed the stream 306 of closed captioning data at a bitrate that is faster than the audio-visual stream 302 of data. Similarly, when the stream 306 of closed captioning data leads the audio-visual stream 302 of data, then the closed captioning correction application 30 may calculate what decrease in the bitrate 322 of the stream 306 of closed captioning data is needed to compensate for the synchronization error. Here, then, exemplary embodiments create a feedback mechanism in which the closed captioning correction application 30 may instruct the closed captioning source server 308 to compensate for synchronization errors.

FIG. 18 illustrates the feedback mechanism for the A/V source server 304. Here, when the closed captioning correction application 30 observes a synchronization error, the closed captioning correction application 30 may instruct the A/V source server 304 to alter its source bitrate 322. That is, the synchronization message 320 is sent to the A/V source server 304 via the communications network (illustrated as reference numeral 24 in FIG. 1). The synchronization message 320 instructs the A/V source server 304 to send or transmit the audio-visual stream 302 of data at the pre-determined bitrate 322 to compensate for the observed synchronization error.

Exemplary embodiments may thus "boost" and "retard" information. Suppose, for example, that the stream 306 of closed captioning data is formatted according to the EIA-708-C standard. The EIA-708 formatted stream 306 of closed captioning data may be injected into MPEG-2 video streams in the picture user data. Here exemplary embodiments, then, may send the stream 306 of closed captioning data at any pre-determined rate within a larger channel of a maximum 9600 kbit/sec bitrate. This maximum bitrate allows transmission of the textual captions in various languages (and, in the future, other uses may be possible). The closed captioning correction application 30 may instruct the closed captioning source server 308 to send the stream 306 of closed captioning data at any bitrate within the EIA-708-C standard, up to the maximum 9600 kbit/sec. The closed captioning source server 308, of course, may be instructed to feed the stream 306 of closed captioning data at a bitrate greater than 9600 kbit/sec. A new standard may be developed, or the closed captioning source server 308 may be instructed to disregard any maximum bitrate. The closed captioning source server 308, in short, may be instructed to transmit the stream 306 of closed captioning data at any bitrate to compensate for synchronization errors. Likewise, the A/V source server 304 may be instructed to transmit the audio-visual stream 302 of data at any bitrate to compensate for synchronization errors.

Figure 19:
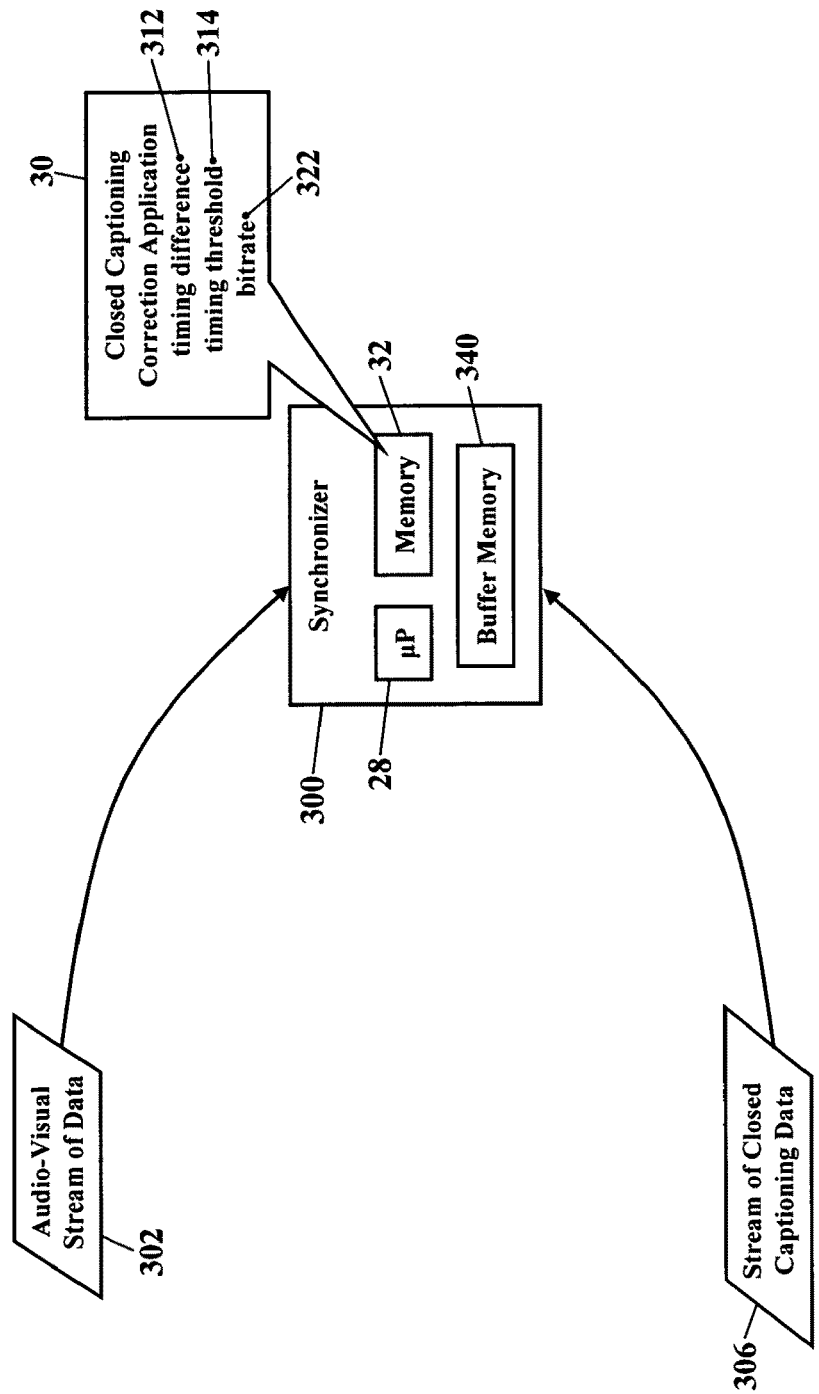
FIG. 19 is another schematic illustrating the closed captioning correction application, according to even more exemplary embodiments.

FIG. 19 is another schematic illustrating the closed captioning correction application 30, according to even more exemplary embodiments. Here the synchronizer 300 may utilize buffer memory 340 to resolve synchronization errors. When the synchronizer 300 receives the stream 306 of closed captioning data, the stream 306 of closed captioning data may be at least temporarily stored in the buffer memory 340. The closed captioning correction application 30 may then retrieve the stream 306 of closed captioning data from the buffer memory 340 at any bitrate 322 that is desired to resolve synchronization errors. Similarly, the synchronizer 300 may additionally or alternatively store the audio-visual stream 302 of data in the buffer memory 340. The closed captioning correction application 30 may then retrieve the audio-visual stream 302 of data from the buffer memory 340 at any bitrate 322 needed to resolve synchronization errors.

Figure 20:
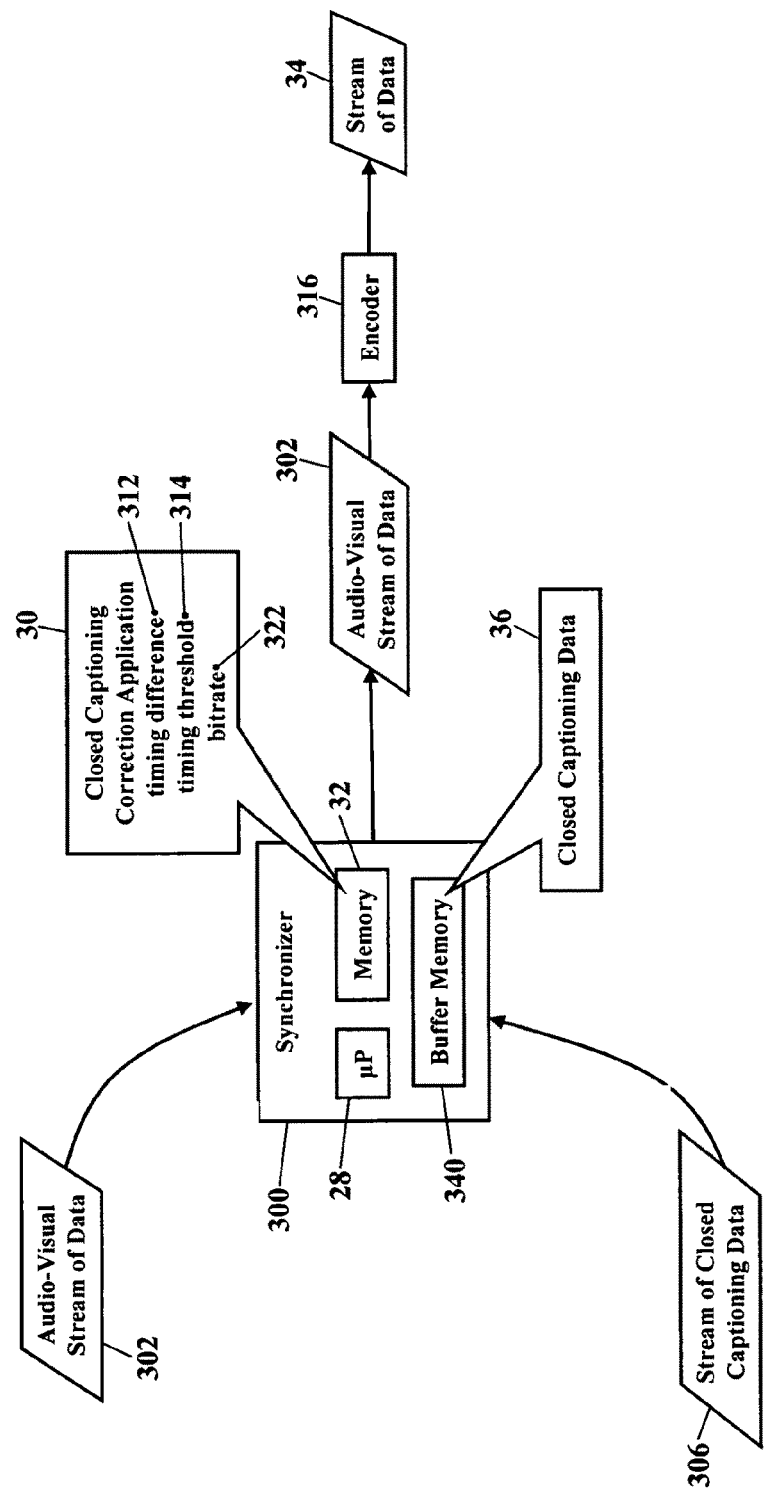
FIGS. 20-23 are additional schematics illustrating the closed captioning correction application, according to still more exemplary embodiments.

FIG. 20 is yet another schematic illustrating the closed captioning correction application 30, according to still more exemplary embodiments. Here the closed captioning correction application 30 corrects synchronization errors when the stream 306 of closed captioning data is at least momentarily interrupted. As this disclosure earlier explained, propagation or processing delays may cause a lead or lag condition between the audio-visual stream 302 of data and the stream 306 of closed captioning data. Or, as also previously explained, a human transcriptionist may sometimes "fall behind," again causing the stream 306 of closed captioning data to lag the spoken, audio-visual stream 302 of data. Whatever the cause(s), the stream 306 of closed captioning data may be at least momentarily interrupted.

FIG. 20, then, illustrates solutions for interruptions. The synchronizer 300 receives the audio-visual stream 302 of data and the stream 306 of closed captioning data. The closed captioning correction application 30 may store the received streams 302 and 306 in the buffer memory 340. The closed captioning correction application 30 may also continuously compare the timing information (illustrated as reference numeral 310 in FIG. 16) contained within, or embedded within, the audio-visual stream 302 of data and within the stream 306 of closed captioning data. When the stream 306 of closed captioning data is interrupted, the synchronizer 300 at least momentarily stops receiving the stream 306 of closed captioning data. Yet the synchronizer 300 may still receive the audio-visual stream 302 of data. A solution for this interruption, then, is to delay the audio-visual stream 302 of data for a duration that the stream 306 of closed captioning data is missing. That is, when the synchronizer 300 stops receiving the stream 306 of closed captioning data, the synchronizer 300 still has a reservoir of the closed captioning data 36 stored in the buffer memory 340. The synchronizer 300 may thus continue to retrieve the closed captioning data 36 that is stored in the buffer memory 340. If the disruption is too long, however, the buffer memory 340 will eventually empty. When the buffer memory 340 is empty, and the stream 306 of closed captioning data is still missing, then the closed captioning correction application 30 may no longer provide the closed captioning data 36 to the encoder 316. That is, the synchronizer 300 only outputs the audio-visual stream 302 of data to the encoder 316. When the encoder 316 produces the stream 34 of data, the stream 34 of data has no closed captioning data 36 encoded therein. The closed captioning customer, then, still receives the audio-visual signal, but there is no closed captioning component.

Another solution may delay the audio-visual stream 302 of data. When the stream 306 of closed captioning data is interrupted, the synchronizer 300 stops receiving the stream 306 of closed captioning data. Exemplary embodiments may delay the audio-visual stream 302 of data while the stream 306 of closed captioning data is interrupted. If, for example, the stream 306 of closed captioning data is missing or interrupted for one second, this solution delays the audio-visual stream 302 of data for the same one second duration. This solution, then, maintains synchronization, despite the interruption. If the disruption is too long, though, the closed captioning customer will not tolerate a missing signal and the customer will switch to another channel or source.

Figure 21:
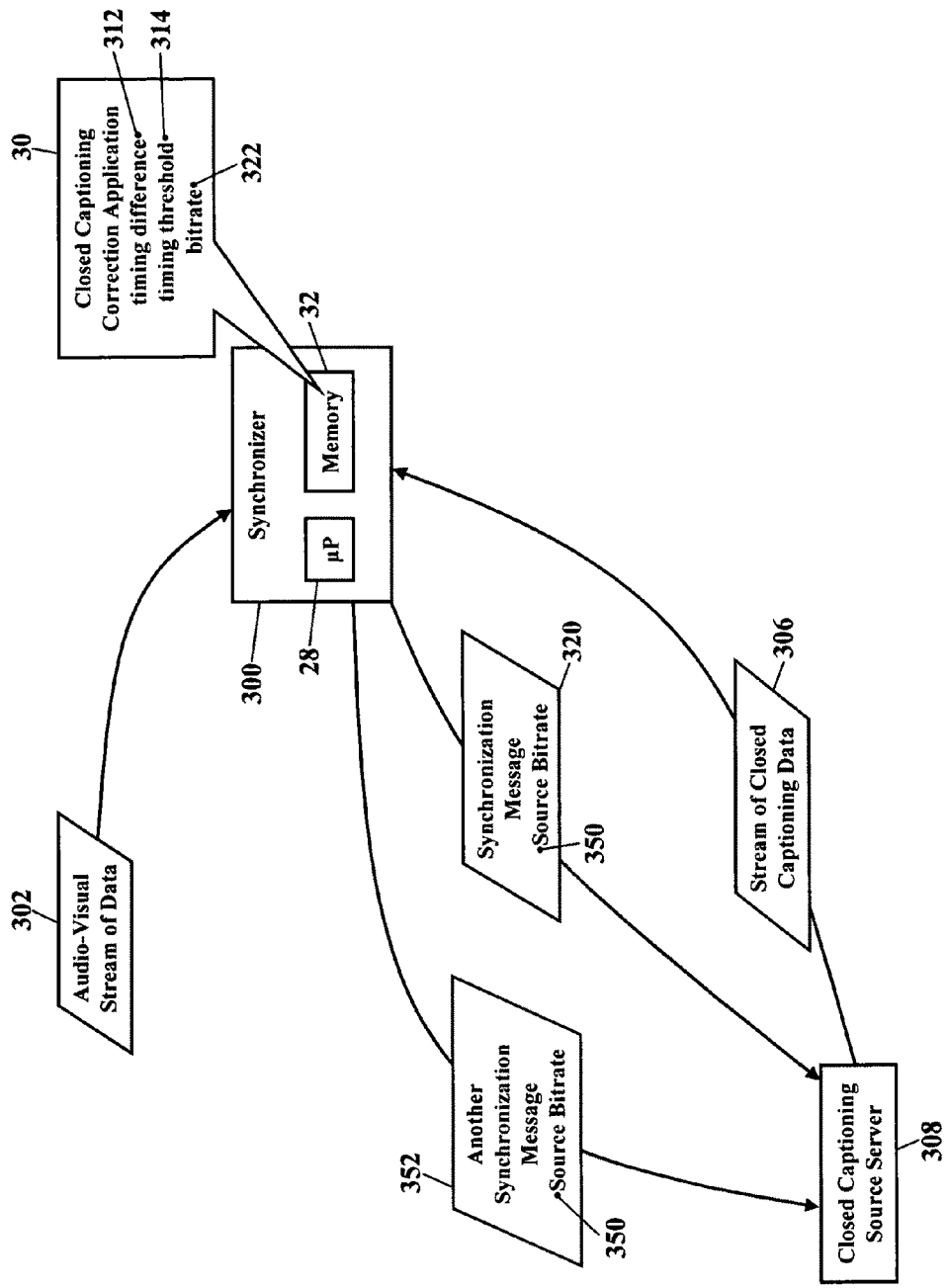

FIG. 21 is another schematic illustrating the closed captioning correction application 30, according to still more exemplary embodiments. Here the closed captioning correction application 30 may "boost" the bitrate 322 of the closed captioning data 36. When the stream 306 of closed captioning data is momentarily interrupted, the closed captioning correction application 30 may instruct the closed captioning source server 308 to dynamically increase the bitrate 322 of the stream 306 of closed captioning data. The closed captioning correction application 30 sends the synchronization message 320 to the closed captioning source server 308 via the communications network (illustrated as reference numeral 24 in FIG. 1). The synchronization message 320 instructs the closed captioning source server 308 to increase or boost its source bitrate 350 to resolve a "lag" in the closed captioning data 36. That is, the synchronization message 320 instructs the closed captioning source server 308 to send or transmit the audio-visual stream 302 of data at a faster or greater bitrate 322 to compensate for the interruption in the stream 306 of closed captioning data. The closed captioning source server 308, for example, may be instructed to send the stream 306 of closed captioning data at a full channel rate (e.g., 9600 kbit/s) until the lag is resolved. When the synchronization error is resolved, the captioning correction application 30 sends another synchronization message 352 that instructs the closed captioning source server 308 reduce the source bitrate 350 (such as a "normal" sending rate for an "in-band" scenario).

Figure 22:
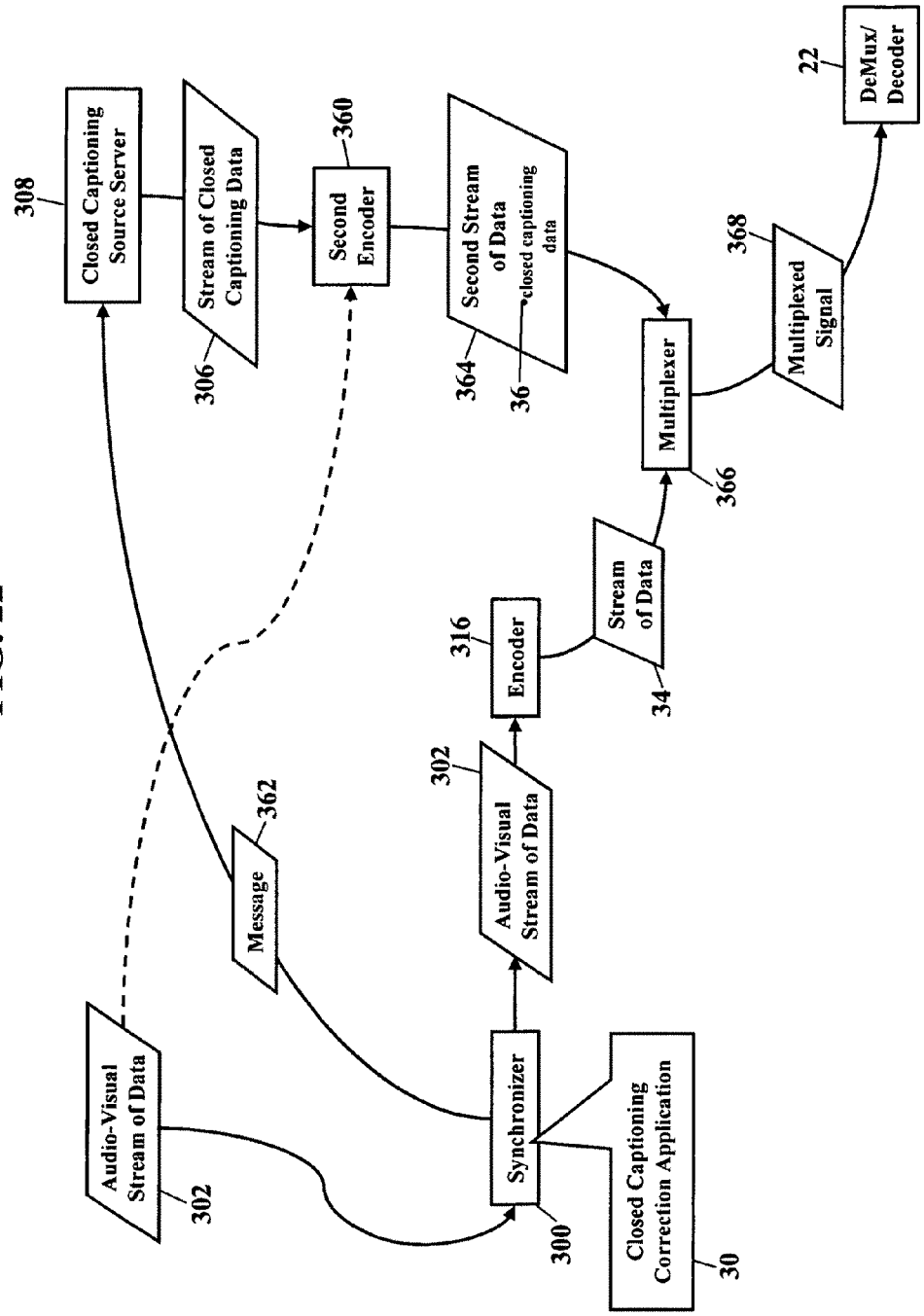

FIG. 22 is another schematic illustrating the closed captioning correction application 30, according to still more exemplary embodiments. Here the closed captioning correction application 30 may arrange for two streams of closed captioning data to "make up" for missing closed captioning data. According to this example, because the synchronizer 300 only receives the stream 306 of closed captioning data, the closed captioning correction application 30 concludes that the stream of closed captioning data (illustrated as reference numeral 306 in FIGS. 16-21) is missing or interrupted. The synchronizer 300 thus only outputs the audio-visual stream 302 of data to the encoder 316 (as the paragraphs accompanying FIG. 20 explained). When the encoder 316 produces the stream 34 of data, the stream 34 of data has no closed captioning data 36 encoded therein.

This solution, then, arranges for a second encoder 360. The second encoder 360 receives the stream 306 of closed captioning data from the closed captioning source server 308. The second encoder 360 may or may not also receive the audio-visual stream 302 of data. The closed captioning correction application 30 sends a message 362 to the second encoder 360. If the second encoder 360 is receiving the audio-visual stream 302 of data, the message 362 instructs the second encoder 360 to ignore, or stop receiving, the audio-visual stream 302 of data. The message 362 also instructs the second encoder 360 to produce a second stream 364 of data and to send or route that second stream 364 of data to a multiplexer 366. The second stream 364 of data, however, only contains the closed captioning data 36. That is, the second stream 364 of data does not contain audio-visual data. The second stream 364 of data may be sent with an increased bandwidth, if possible. The second stream 364 of data may "make up" for synchronization errors. The multiplexer 366 multiplexes together the stream 34 of data and the second stream 364 of data (having only the closed captioning data 36). The multiplexer 366 outputs a multiplexed signal 368, and the multiplexed signal 368 is routed to the decoder 22. The decoder 22 may then de-multiplex and decode the closed captioning data 36 and the audio-visual stream 302 of data. This solution, then, presents an "out of band" scenario.

Figure 23:
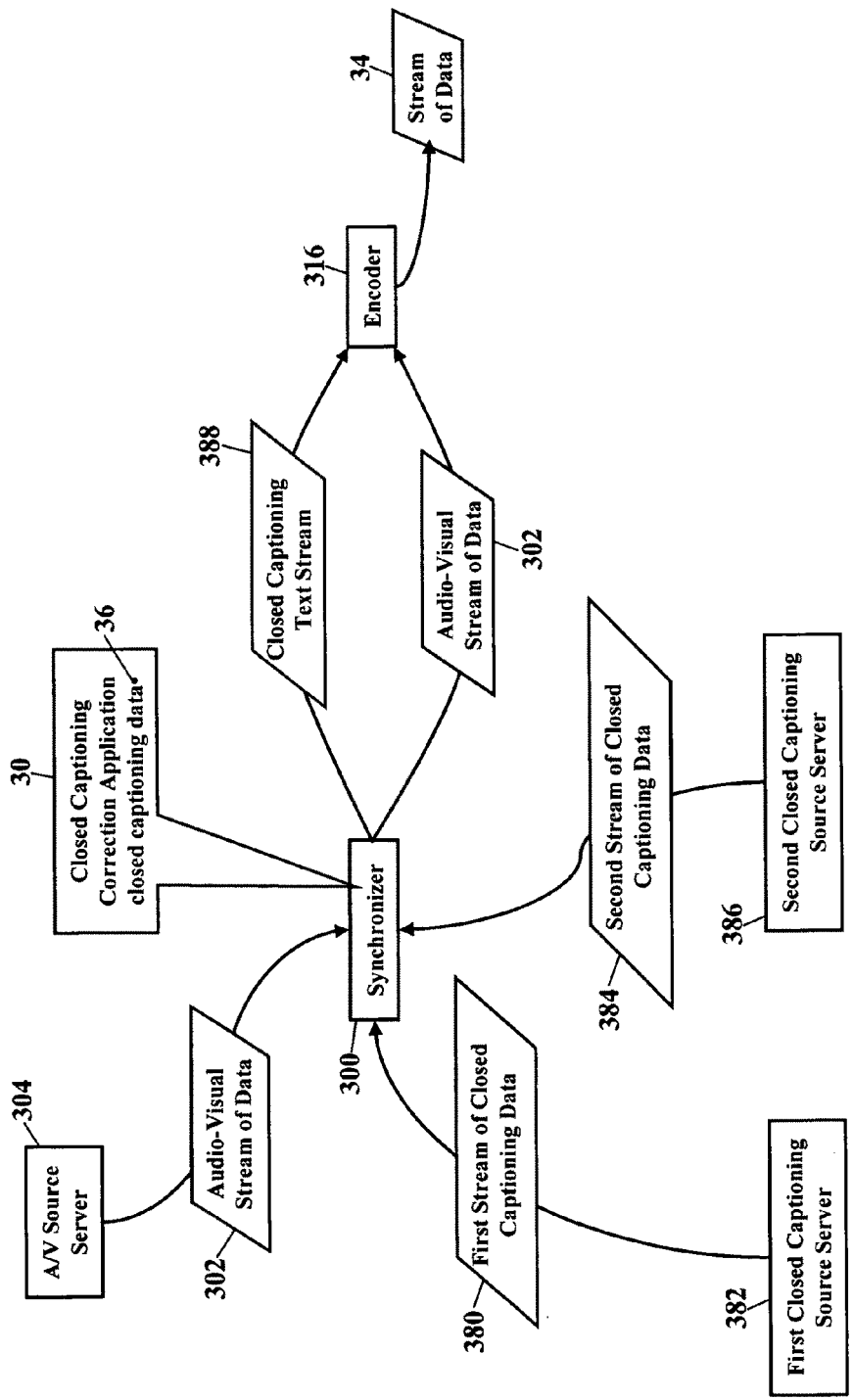

FIG. 23 is another schematic illustrating the closed captioning correction application 30, according to still more exemplary embodiments. Here the closed captioning correction application 30 may receive the closed captioning data 36 from multiple sources and/or multiple providers. The synchronizer 300 receives a first stream 380 of closed captioning data from a first closed captioning source server 382. As FIG. 23 illustrates, the synchronizer 300 may also receive a second stream 384 of closed captioning data from a second closed captioning source server 386. The first 382 and second 386 closed captioning source servers may be operated by the same, or different, provides of the closed captioning data 36. The synchronizer 300 combines the first stream 380 of closed captioning data with the second stream 384 of closed captioning data to create or produce a more robust and stable closed captioning text stream 388. The synchronizer 300 may also receive the audio-visual stream 302 of data from the A/V source server 304. The synchronizer 300, as before, synchronizes the audio-visual stream 302 of data and the closed captioning text stream 388. The encoder 316 then encodes the closed captioning text stream 388 with the audio-visual stream 302 of data. This solution thus resolves any interruption in any one of the first 382 and second 386 closed captioning source servers. Because multiple sources are used for the closed captioning data 36, any one of the source servers 382 or 386 may experience a failure without jeopardizing the closed captioning data 36. Regardless of how many sources provide the closed captioning data 36, any of the sources may experience an interruption or failure, as long as one of the sources is still providing the closed captioning data 36.

Figure 24:
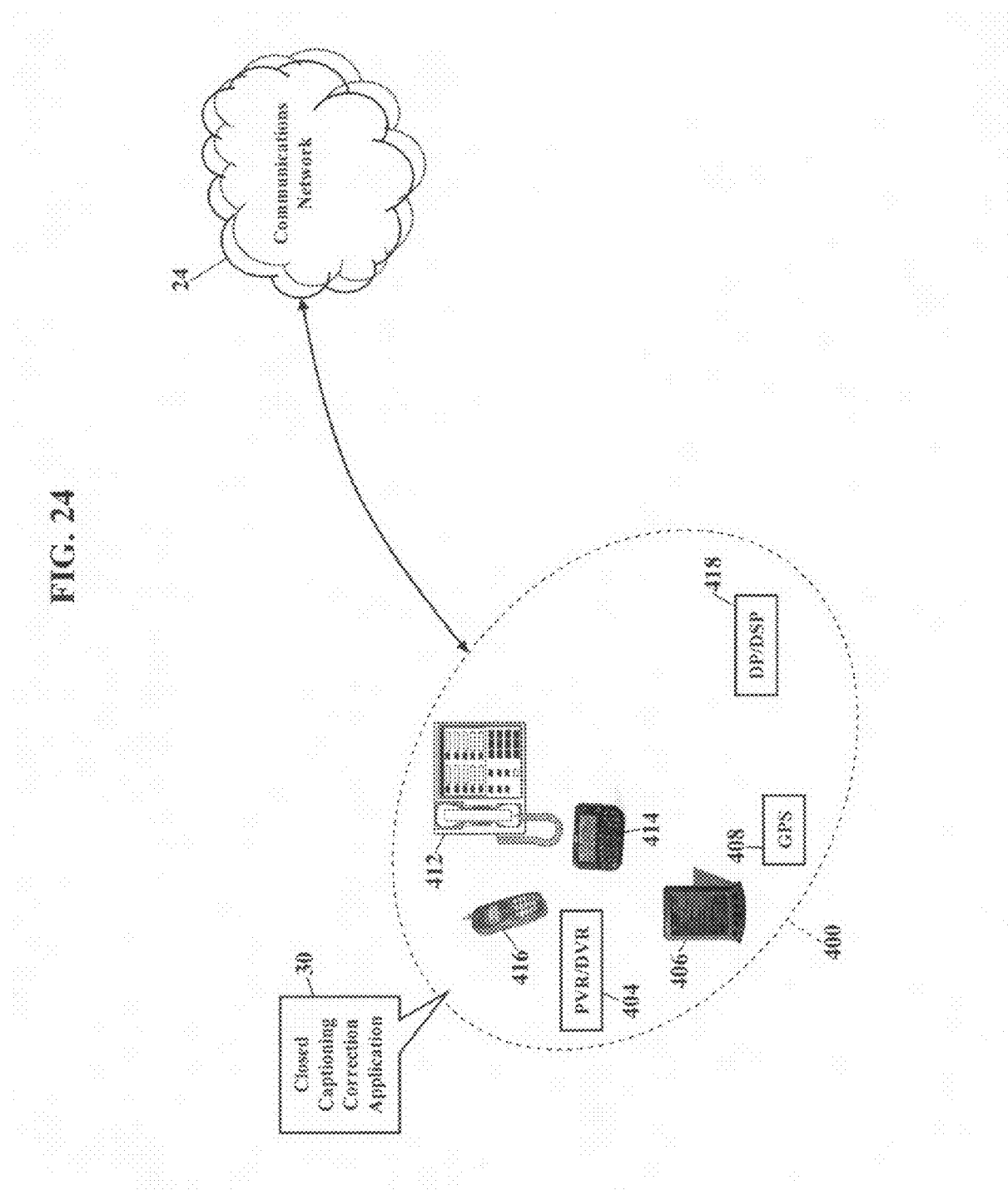
FIG. 24 depicts other possible operating environments for additional aspects of the exemplary embodiments.

FIG. 24 depicts other possible operating environments for additional aspects of the exemplary embodiments. FIG. 24 illustrates that the closed captioning correction application 30 may alternatively or additionally operate within various other electronic devices 400. FIG. 24, for example, illustrates that the closed captioning correction application 30 may entirely or partially operate within a personal/digital video recorder (PVR/DVR) 404, personal digital assistant (PDA) 406, a Global Positioning System (GPS) device 408, an Internet Protocol (IP) phone 412, a pager 414, a cellular/satellite phone 416, or any computer system and/or communications device utilizing a digital processor and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME)* interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Exemplary embodiments may be physically embodied on or in a computer-readable media This computer-readable media may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable media could be distributed to end-subscribers, licensees, and assignees. These types of computer-readable media, and other types not mention here but considered within the scope of the exemplary embodiments, comprise processor-executable instructions for correcting closed captioning data.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of correcting closed-captioning data, comprising:
   receiving a digital stream having the closed captioning data encoded therein;
   decoding the closed captioning data from the received digital stream;
   storing a sequence of closed captioning characters from decoded closed captioning data;
   storing a preceding sequence of closed captioning characters and a subsequent sequence of closed captioning characters that flanks the sequence of closed captioning characters;
   borrowing at least one trailing character from the preceding sequence of closed captioning characters;
   borrowing at least one leading character from the subsequent sequence of closed captioning characters;
   appending the at least one trailing character as a prefix to a beginning of the sequence of closed captioning characters to create an extended sequence of closed captioning characters;
   appending the at least one leading character as a suffix to an end of the extended sequence of closed captioning characters;
   querying patterns of characters stored in memory to determine whether the extended sequence of closed captioning characters contains at least one of the patterns of characters stored in the memory;
   if the extended sequence of closed captioning characters contains at least one of the patterns of characters stored in the memory, then diverting the extended sequence of closed captioning characters to a syntactical checker; and
   if the extended sequence of closed captioning characters fails to contain at least one of the patterns of characters stored in the memory, then processing the extended sequence of closed captioning characters for display.

2. The method according to claim 1, further comprising receiving updated patterns of characters.

3. The method according to claim 2, further comprising storing the updated patterns of characters in the memory.

4. The method according to claim 1, wherein acquiring the sequence of closed captioning characters comprises acquiring a predetermined number of sequential characters from the decoded closed captioning data.

5. The method according to claim 1, further comprising:
   acquiring individual characters in the closed captioning data;
   incrementing a character counter stored in the memory as each individual character is acquired;
   comparing the character counter to a sequence value;
   storing the individual characters as the sequence of closed captioning characters when the character counter equals the sequence value.

6. The method according to claim 1, further comprising performing an update when a predetermined number of sequences of closed captioning characters is obtained.

7. The method according to claim 1, further comprising storing the patterns of characters in the memory, wherein storing the patterns of characters comprises storing a pattern of characters representing an error.

8. The method according to claim 1, wherein when the extended sequence of closed captioning characters is diverted, then filtering the pattern of characters from the extended sequence of closed captioning characters.

9. The method according to claim 8, further comprising replacing the pattern of characters with replacement characters to create a modified sequence of closed captioning characters.

10. The method according to claim 9, further comprising processing the modified sequence of closed captioning characters for display.

11. The method according to claim 1, further comprising:
    at least one of i) spell-checking the extended sequence of closed captioning characters to correct spelling errors and ii) grammar-checking the extended sequence of closed captioning characters to correct grammatical errors; and
    if an error is detected, and if multiple corrections are found, then selecting a correction that is highest ranked.

12. The method according to claim 11, further comprising:
    when an error is detected, and if the correction is unknown, then determining a severity of the error; and
    if the severity of the error is below a threshold, then ignoring the error and processing the extended sequence of closed captioning characters for display.

13. The method according to claim 12, wherein if the severity of the error is equal to or greater than the threshold, then deleting the extended sequence of closed captioning characters.

14. A system for correcting closed-captioning data, comprising:
    a processor executing code stored in memory that causes the processor to:
    receive a digital stream having the closed captioning data encoded therein;
    decode the closed captioning data from the received digital stream;
    store a sequence of closed captioning characters from decoded closed captioning data;
    store a preceding sequence of closed captioning characters and a subsequent sequence of closed captioning characters that flanks the sequence of closed captioning characters;
    borrow at least one trailing character from the preceding sequence of closed captioning characters;
    borrow at least one leading character from the subsequent sequence of closed captioning characters;
    append the at least one trailing character as a prefix to a beginning of the sequence of closed captioning characters to create an extended sequence of closed captioning characters;
    append the at least one leading character as a suffix to an end of the extended sequence of closed captioning characters;
    query patterns of characters stored in memory to determine whether the extended sequence of closed captioning characters contains at least one of the patterns of characters stored in the memory;
    if the extended sequence of closed captioning characters contains at least one of the patterns of characters stored in the memory, then divert the extended sequence of closed captioning characters to a syntactical checker; and if the extended sequence of closed captioning characters fails to contain at least one of the patterns of characters stored in the memory, then process the extended sequence of closed captioning characters for display.

15. The system according to claim 14, wherein the code further causes the processor to receive updated patterns of characters.

16. The system according to claim 14, wherein the code further causes the processor to:
acquire individual characters in the closed captioning data
increment a character counter stored in the memory as each individual character is acquired;
compare the character counter to a sequence value;
store the individual characters as the sequence of closed captioning characters when the character counter equals the sequence value.

17. The system according to claim 14, wherein the code further causes the processor to perform an update when a predetermined number of sequences of closed captioning characters is obtained.

18. The system according to claim 14, wherein the code further causes the processor to store the patterns of characters in the memory that represent an error.

19. The system according to claim 14, wherein the code further causes the processor to filter the pattern of characters from the extended sequence of closed captioning characters.

20. A non-transitory computer readable medium storing processor executable instructions for performing a method of correcting closed-captioning data, the method comprising:
receiving a digital stream having the closed captioning data encoded therein;
decoding the closed captioning data from the received digital stream;
storing a sequence of closed captioning characters from decoded closed captioning data;
storing a preceding sequence of closed captioning characters and a subsequent sequence of closed captioning characters that flanks the sequence of closed captioning characters;
borrowing at least one trailing character from the preceding sequence of closed captioning characters;
borrowing at least one leading character from the subsequent sequence of closed captioning characters;
appending the at least one trailing character as a prefix to a beginning of the sequence of closed captioning characters to create an extended sequence of closed captioning characters;
appending the at least one leading character as a suffix to an end of the extended sequence of closed captioning characters;
querying patterns of characters stored in memory to determine whether the extended sequence of closed captioning characters contains at least one of the patterns of characters stored in the memory;
if the extended sequence of closed captioning characters contains at least one of the patterns of characters stored in the memory, then diverting the extended sequence of closed captioning characters to a syntactical checker; and
if the extended sequence of closed captioning characters fails to contain at least one of the patterns of characters stored in the memory, then processing the extended sequence of closed captioning characters for display.

\* \* \* \* \*